US010070361B2

(12) United States Patent
Fukuta et al.

(10) Patent No.: US 10,070,361 B2
(45) Date of Patent: *Sep. 4, 2018

(54) USER TERMINAL FOR NETWORK SELECTION IN A COMMUNICATION SYSTEM

(71) Applicant: KYOCERA CORPORATION, Kyoto (JP)

(72) Inventors: Noriyoshi Fukuta, Yokohama (JP); Henry Chang, San Diego, CA (US); Yushi Nagasaka, Yokohama (JP); Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/722,078

(22) Filed: Oct. 2, 2017

(65) Prior Publication Data
US 2018/0027469 A1  Jan. 25, 2018

Related U.S. Application Data

(63) Continuation of application No. 14/936,173, filed on Nov. 9, 2015, which is a continuation of application No. PCT/JP2014/057920, filed on Mar. 20, 2014.

(Continued)

(51) Int. Cl.
*H04W 36/22* (2009.01)
*H04W 48/20* (2009.01)
(Continued)

(52) U.S. Cl.
CPC ........... *H04W 36/22* (2013.01); *H04W 36/14* (2013.01); *H04W 48/16* (2013.01); *H04W 48/20* (2013.01); *H04W 84/12* (2013.01)

(58) Field of Classification Search
CPC . H04W 88/14; H04W 76/021; H04W 60/005; H04W 60/04; H04W 48/10;
(Continued)

(56) References Cited

U.S. PATENT DOCUMENTS

2011/0044253 A1  2/2011  Zisimopoulos
2012/0023189 A1  1/2012  Giaretta et al.
(Continued)

FOREIGN PATENT DOCUMENTS

WO  2012064067 A2  5/2012

OTHER PUBLICATIONS

International Search Report issued in PCT/JP2014/057920, dated Apr. 28, 2014.
(Continued)

*Primary Examiner* — Joshua Kading
(74) *Attorney, Agent, or Firm* — Studebaker & Brackett PC

(57) ABSTRACT

A user terminal includes a controller that performs selection of an access network in which the user terminal exchanges traffic from among a cellular RAN (Radio Access Network) and a WLAN (Wireless Local Area Network). The controller stores a RAN rule for determining traffic steering to a WLAN having a RAN provided identifier (ID), receives a WLAN ID broadcasted from a cellular base station (BS), applies the WLAN ID to the RAN rule to determine whether to perform traffic steering, roaming from the RAN to another RAN, determines whether to acquire another WLAN ID provided by the other RAN based on a policy established by the RAN, receives the other WLAN ID from a second BS of the other RAN, and applies the other WLAN ID to the RAN rule to determine whether to perform traffic steering to the WLAN having the other WLAN ID, in the second cellular RAN.

3 Claims, 14 Drawing Sheets

Related U.S. Application Data

(60) Provisional application No. 61/934,391, filed on Jan. 31, 2014, provisional application No. 61/822,161, filed on May 10, 2013.

(51) Int. Cl.
*H04W 36/14* (2009.01)
*H04W 48/16* (2009.01)
*H04W 84/12* (2009.01)

(58) Field of Classification Search
CPC ..... H04W 48/16; H04W 48/17; H04W 48/20; H04W 36/0005; H04W 36/0011; H04W 36/0016; H04W 36/0022; H04W 36/0033; H04W 36/0066; H04W 36/0077; H04W 36/0083; H04W 36/14; H04W 36/16; H04W 36/165; H04W 36/22; H04W 36/34; H04W 36/36; H04W 36/38; H04W 8/02–8/08; H04W 8/10; H04W 8/12; H04W 8/26; H04W 8/28
See application file for complete search history.

(56) References Cited

U.S. PATENT DOCUMENTS

| | | |
|---|---|---|
| 2013/0073710 A1 | 3/2013 | Lee |
| 2014/0003239 A1 | 1/2014 | Etemad et al. |
| 2014/0079022 A1 | 3/2014 | Wang et al. |
| 2014/0287746 A1 | 9/2014 | Faccin et al. |
| 2014/0295913 A1 | 10/2014 | Gupta |
| 2014/0307551 A1 | 10/2014 | Forssell |
| 2015/0296440 A1 | 10/2015 | Forssell et al. |
| 2016/0007276 A1 | 1/2016 | Forssell |
| 2016/0044586 A1 | 2/2016 | Koskinen et al. |
| 2016/0066245 A1 | 3/2016 | Vikberg et al. |
| 2016/0066251 A1 | 3/2016 | Sirotkin et al. |

OTHER PUBLICATIONS

Intel Corporation; New Study Item Proposal on WLAN/3GPP Radio Interworking; 3GPP TSG-RAN Meeting #57; RP-1201455; Sep. 13-15, 2012; pp. 1-5 ; Chicago, USA.

The extended European search report issued by the European Patent Office dated Jan. 11, 2017, which corresponds to European Patent Application No. 14795093.5 and is related to U.S. Appl. No. 14/936,173.

3GPP TR 37.834 V0.2.0, Technical Specification Group Radio Access Network; Study on WLAN/3GPP Radio Interworking (Release 12), Valbonne, France, Apr. 2013, 10 pp.

Kyocera, LG Electronics Inc., "Clarification of RAN rules and ANDSF in Solution 2," 3GPP TSG-RAN WG2 #83, R2-132807, Barcelona, Spain, Aug. 19-Aug. 23, 2013, 6 pp.

LG Electronics Inc., KYOCERA, "Text proposal on WLAN3GPP radio interworking solution 2," 3GPP TSG-RAN2 Meeting #82, Draft R2-132193, Fukuoka, Japan, May 20-May 24, 2013, 4 pp.

Intel Corporation; WLAN/3GPP access network selection based on maximum achievable rate metric; 3GPP TSG RAN2 Meeting #81bis; R2-131348; Apr. 15-19, 2013; total 8 pages; Chicago, USA.

FIG. 17
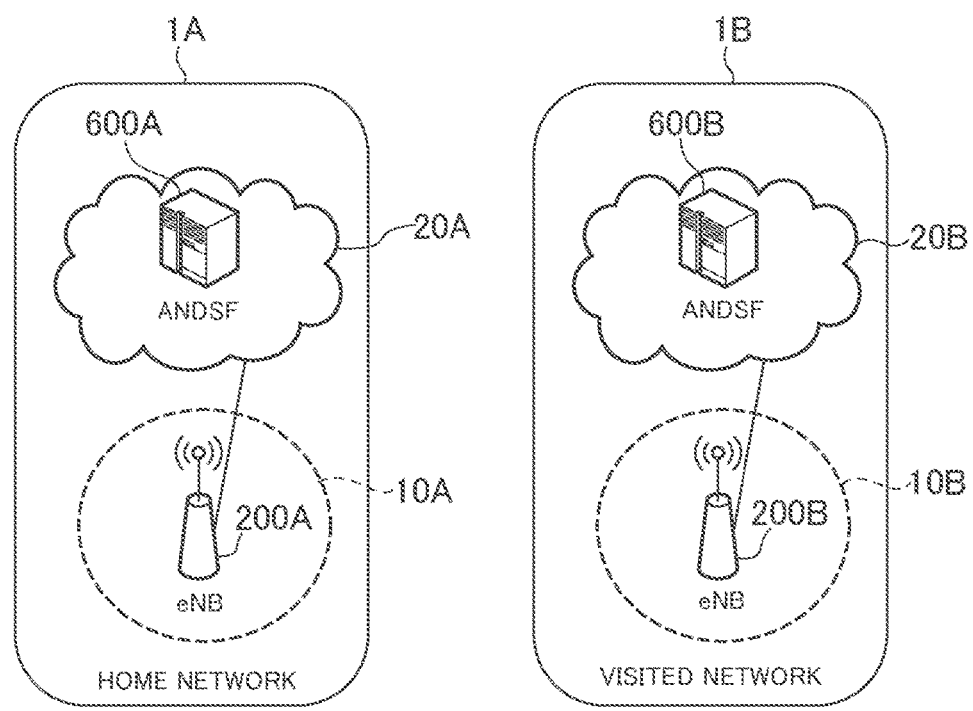
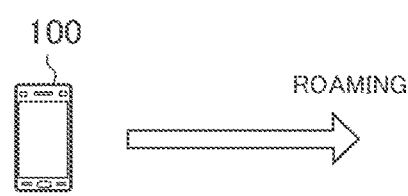

USER TERMINAL FOR NETWORK SELECTION IN A COMMUNICATION SYSTEM

CROSS REFERENCE TO RELATED APPLICATIONS

This application is a Continuation Application of U.S. patent application Ser. No. 14/936,173 filed Nov. 9, 2015, which is a Continuation Application of International Patent Application No. PCT/JP2014/057920 filed Mar. 20, 2014, which claims benefit of U.S. Provisional Application Nos. 61/822,161 filed May 10, 2013 and 61/934,391 filed Jan. 31, 2014, the entire contents of which are incorporated herein by reference.

TECHNICAL FIELD

The present disclosure relates to a communication control method used in a cellular communication system capable of working together with a wireless LAN system (WLAN system).

BACKGROUND ART

Recently, a user terminal (so-called dual terminal) having a cellular communication unit and a WLAN communication unit becomes popular. Moreover, WLAN access points (hereinafter simply referred to as "access points") managed by an operator of a cellular communication system increases.

3GPP ($3^{rd}$ Generation Partnership Project), which is a standardization project of a cellular communication system, is planning to consider a technique capable of enhancing interworking between the cellular communication system and the WLAN system in a radio access network (RAN) level (see Non-patent document 1).

Then, one of the purposes of such technique is balancing the load level of cellular base stations and access points by increasing the usage rate of access points.

On the other hand, in order to achieve efficient access point discovery process performed by a user terminal, the standardization of ANDSF (Access Network Discovery and Selection Function) is currently in progress.

In ANDSF, an ANDSF server existing in a core network provides WLAN-associated information to a user terminal by a NAS (Non Access Stratum) message.

PRIOR ART DOCUMENT

Non-Patent Document

Non-patent document 1: 3GPP contribution RP-1201455

SUMMARY

However, all user terminals are not necessarily available the ANDSF because the ANDSF is an optional function.

Moreover, the ANDSF is a NAS function and only provides basic information on WLAN.

Therefore, there is a room for improving the access point discovery process by a user terminal in the prior art.

Thus, the objective of the present disclosure is to achieve more efficient access point discovery process in a user terminal.

A user terminal according to the present disclosure comprises a controller containing at least one processor, and configured to perform a network selection operation for selecting an access network in which the user terminal exchanges traffic from among a cellular RAN (Radio Access Network) and a wireless LAN (Local Area Network). The controller is further configured to store a RAN rule predefined in layers of the cellular RAN, wherein the RAN rule is a network selection rule for determining whether the user terminal should perform traffic steering to the WLAN that has a WLAN identifier provided by the cellular RAN, wherein the WLAN identifier is one of SSID (Service Set Identifier), BSSID (Basic Service Set Identifier), and HESSID (Homogenous Extended Service Set Identifier), receive a first WLAN identifier broadcasted in a first SIB (system information block) from a first cellular base station of a first cellular RAN which is a home network of the user terminal, apply the first WLAN identifier to the RAN rule to determine whether to perform the traffic steering to a first WLAN that has the first WLAN identifier, in the first cellular RAN, perform roaming from the first cellular RAN to a second cellular RAN, which is a visited network, determine whether to acquire a second WLAN identifier provided by the second cellular RAN, based on a policy established by the first cellular RAN, receive the second WLAN identifier broadcasted in a second SIB from a second cellular base station of the second cellular RAN, and apply the second WLAN identifier to the RAN rule to determine whether to perform traffic steering to the WLAN that has the second WLAN identifier, in the second cellular RAN.

A device to be equipped in a user terminal according to the present disclosure comprises a processor and a memory. The processor is configured to cause the user terminal to perform a network selection operation for selecting an access network in which the user terminal exchanges traffic from among a cellular RAN (Radio Access Network) and a wireless LAN (Local Area Network). The processor is further configured to cause the user terminal to store a RAN rule predefined in layers of the cellular RAN, wherein the RAN rule is a network selection rule for determining whether the user terminal should perform traffic steering to the WLAN that has a WLAN identifier provided by the cellular RAN, wherein the WLAN identifier is one of SSID (Service Set Identifier), BSSID (Basic Service Set Identifier), and HESSID (Homogenous Extended Service Set Identifier), receive a first WLAN identifier broadcasted in a first SIB (system information block) from a first cellular base station of a first cellular RAN which is a home network of the user terminal, apply the first WLAN identifier to the RAN rule to determine whether to perform the traffic steering to a first WLAN that has the first WLAN identifier, in the first cellular RAN, perform roaming from the first cellular RAN to a second cellular RAN, which is a visited network, determine whether to acquire a second WLAN identifier provided by the second cellular RAN, based on a policy established by the first cellular RAN, receive the second WLAN identifier broadcasted in a second SIB from a second cellular base station of the second cellular RAN, and apply the second WLAN identifier to the RAN rule to determine whether to perform traffic steering to the WLAN that has the second WLAN identifier, in the second cellular RAN.

BRIEF DESCRIPTION OF DRAWINGS

FIG. 17 is a diagram illustrating a roaming scenario according to the third embodiment.

DESCRIPTION OF EMBODIMENTS

Overview of Embodiment

Figure 1:
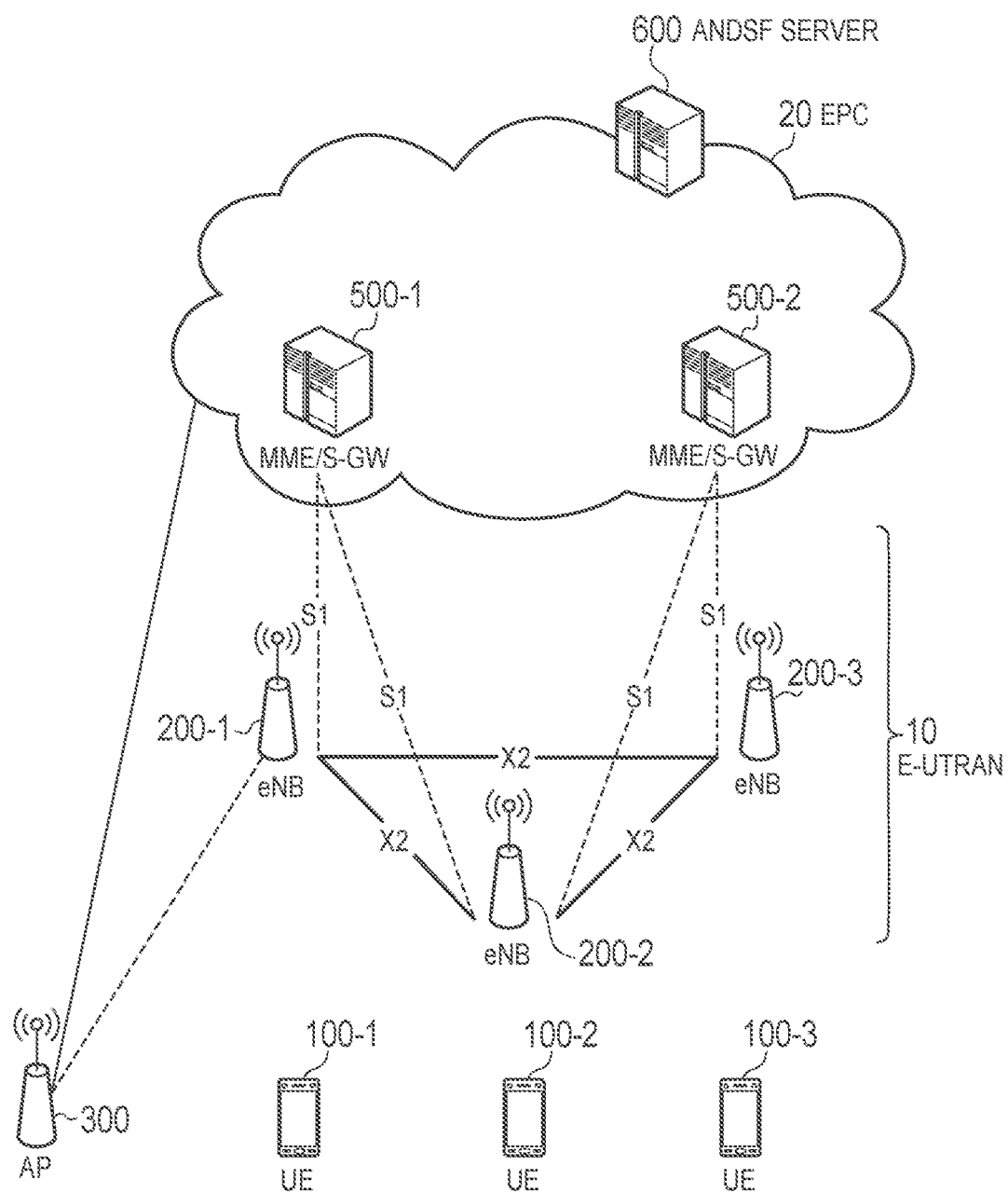
FIG. 1 is a system configuration diagram according to first to third embodiments.

A communication control method according to a first embodiment is a method for controlling an access point discovery process performed by a user terminal that supports a cellular communication and a WLAN communication. The communication control method comprises: a step A of broadcasting, from a cellular base station, assistance information for efficiently discovering an access point arranged in a coverage of the cellular base station; and a step B of broadcasting, from the cellular base station, offload indication information for requesting the user terminal to apply the assistance information to the access point discovery process, when an offload for steering a traffic load to the access point is performed.

In the first embodiment, the communication control method further comprises a step C of applying the assistance information to the access point discovery process, when the offload indication information is received by even the user terminal not interested in the assistance information.

In the first embodiment, the user terminal not interested in the assistance information is a user terminal capable of utilizing WLAN-associated information managed by an ANDSF server.

In an operation pattern 1 of the first embodiment, the step C comprises: a step of storing the assistance information received from the cellular base station, without applying the assistance information to the access point discovery process; and a step of applying the stored assistance information to the access point discovery process, when the offload indication information is received from the cellular base station.

In an operation pattern 2 of the first embodiment, the step C comprises: a step of receiving the assistance information from the cellular base station, when the offload indication information is received from the cellular base station; and a step of applying the received assistance information to the access point discovery process.

In the first embodiment, the communication control method further comprises a step D of applying, by the user terminal interested in the assistance information, the assistance information to the access point discovery process even when the offload indication information is not received.

In the first embodiment, the communication control method further comprises a step E of stopping, by the cellular base station, a transmission of the offload indication information when the offload is stopped.

In the first embodiment, the communication control method further comprises a step F of canceling, by the user terminal not interested in the assistance information, an application of the assistance information to the access point discovery process, when the user terminal detects a stop of a transmission of the offload indication information.

In the first embodiment, the assistance information includes at least one of: an identifier of the access point; location information of the access point; and channel information of the access point.

A communication control method according to a second embodiment is a method for controlling an access point discovery process performed by a user terminal that supports a cellular communication and a WLAN communication. The communication control method comprises: a step A of transmitting, from the user terminal to a cellular base station, request information for requesting a transmission of assistance information for efficiently discovering an access point arranged in a coverage of the cellular base station; and a step B of transmitting, by the cellular base station that has received the request information, the assistance information to the user terminal by a unicast.

In an operation pattern 1 of the second embodiment, in the step A, the user terminal that supports ANDSF transmits, to the cellular base station, capability information indicating that the user terminal supports the ANDSF, together with the request information. In the step B, the cellular base station that has received the capability information together with the request information transmits, to the user terminal, a portion out of the assistance information, the portion not included in WLAN-associated information provided from an ANDSF server.

In an operation pattern 2 of the second embodiment, in the step A, the user terminal that supports ANDSF transmits, to the cellular base station together with the request information, a request item indicating a portion out of the assistance information, the portion not included in WLAN-associated information provided from an ANDSF server. In the step B, the cellular base station that has received the request item together with the request information, transmits the portion corresponding to the request item out of the assistance information to the user terminal.

In an operation pattern 3 of the second embodiment, the communication control method further comprises a step C of more preferentially applying, by the user terminal that supports ANDSF, the assistance information received from the cellular base station than WLAN-associated information provided from an ANDSF server, to the access point discovery process.

In the second embodiment, the communication control method further comprises: a step D of transmitting, from the cellular base station to the user terminal by a unicast, new assistance information in accordance with an load level of the access point; and a step E of applying, by the user terminal that has received the new assistance information, the new assistance information to the access point discovery process instead of the assistance information.

In a modification of the second embodiment, the communication control method further comprises a step F of transmitting, from the cellular base station to a neighboring cellular base station, terminal-associated information indicating that the user terminal requests a transmission of the assistance information, when a handover of the user terminal to the neighboring cellular base station is performed.

In the modification of the second embodiment, the communication control method further comprises a step G of transmitting, from the neighboring cellular base station to the user terminal, assistance information for efficiently discovering an access point arranged in a coverage of the neighboring cellular base station, after the user terminal is connected to the neighboring cellular base station.

In the second embodiment, the assistance information includes at least one of: an identifier of the access point; location information of the access point; and channel information of the access point.

A communication control method according to a third embodiment is a method for controlling a network selection operation for selecting an access network, from among a cellular RAN and a wireless LAN, in which a user terminal exchanges a traffic. The user terminal applies, to the network selection operation, at least one of: a RAN rule that is a selection rule pre-defined in the cellular RAN; and an ANDSF rule that is a selection rule provided by an ANDSF. The communication control method comprises: a step A of notifying, from the user terminal to the cellular RAN, ANDSF availability information indicating an availability relating to the ANDSF; a step B of transmitting, from the cellular RAN, RAN assistance information utilized for the network selection operation, on the basis of the ANDSF availability information; and a step C of performing, by the user terminal, the network selection operation on the basis of the RAN assistance information.

In the third embodiment, the ANDSF availability information is information on whether or not the ANDSF is available for the user terminal.

In the third embodiment, the ANDSF availability information includes information on whether or not the ANDSF that is available for the user terminal is an enhanced ANDSF to which the RAN assistance information is applicable.

In the third embodiment, the communication control method further comprises a step of determining whether or not the cellular RAN provides an identifier regarding a WLAN access point to the user terminal, on the basis of whether or not the ANDSF is available for the user terminal.

In the third embodiment, in the step A, the user terminal notifies the cellular RAN of the ANDSF availability information, as a part of terminal capability information.

In the third embodiment, in the step A, the user terminal notifies the cellular RAN of the ANDSF availability information, in response to a request from the cellular RAN.

In the third embodiment, in the step A, the user terminal notifies the cellular RAN of the ANDSF availability information, only when the ANDSF or the enhanced ANDSF is not available for the user terminal.

In the third embodiment, in the step B, a transmission of first RAN assistance information applied only to the RAN rule is omitted, when all target user terminals support the enhanced ANDSF.

In the third embodiment, in the step B, a transmission of second RAN assistance information applied only to the ANDSF rule is omitted, when the enhanced ANDSF is available for no target user terminals.

In the third embodiment, the step B comprises: a step of transmitting common RAN assistance information applied commonly to the RAN rule and the ANDSF rule, by a broadcast; and a step of transmitting, on the basis of the ANDSF availability information, one of first RAN assistance information applied only to the RAN rule and second RAN assistance information applied only to the ANDSF rule.

In the third embodiment, the ANDSF availability information includes information indicating a home ANDSF of the user terminal.

In the third embodiment, the communication control method further comprises a step of determining whether or not the cellular RAN provides an identifier regarding a WLAN access point to the user terminal, on the basis of whether or not the user terminal is a roaming state that is a state where a home network corresponding to the home ANDSF and the cellular RAN are different.

In the third embodiment, the step C comprises: a step of selecting the access network by applying the RAN rule; and a step of performing a network selection by further applying the ANDSF rule to the selected access network.

A communication control method according to a third embodiment is a method for controlling a network selection operation for selecting an access network, from among a cellular RAN and a wireless LAN, in which a user terminal exchanges a traffic. The user terminal applies, to the network selection operation, at least one of: a RAN rule that is a selection rule pre-defined in the cellular RAN; and an ANDSF rule that is a selection rule provided by an ANDSF. The communication control method comprises: a step A of transmitting, from the cellular RAN, both RAN assistance information applied to the RAN rule and RAN assistance information applied to the ANDSF rule, by a broadcast; and a step B of performing, by the user terminal, the network selection operation on the basis of the RAN assistance information.

A communication control method according to a third embodiment is a method for controlling a network selection operation for selecting an access network, from among a cellular RAN and a wireless LAN, in which a user terminal exchanges a traffic. The communication control method comprises: a step A of receiving, by a roaming terminal existing in a visited cellular RAN, an offload indicator from the visited cellular RAN, wherein the offload indicator causes a non-roaming terminal to initiate a traffic steering based on a subscriber class of the non-roaming terminal; and a step B of ignoring, by the roaming terminal, the offload indicator received from the visited cellular RAN.

In the third embodiment, in the step B, the roaming terminal behaves as highest class or lowest class of the subscriber class to ignore the offload indicator.

A communication control method according to a third embodiment is a method for controlling a network selection operation for selecting an access network, from among a cellular RAN and a wireless LAN, in which a user terminal exchanges a traffic. The communication control method comprises: when the user terminal exists in a home network, a step A of using, by the user terminal, a WLAN identifier provided by one of an ANDSF and an enhanced ANDSF of the home network, to the network selection operation; and when the user terminal exists in a visited network, a step B of using, by the user terminal, a WLAN identifier provided by a cellular RAN of the visited network, to the network selection operation.

In the third embodiment, in the step A, the user terminal ignores a WLAN identifier provided by a cellular RAN of the home network.

In the third embodiment, in the step B, the user terminal uses the WLAN identifier provided by the cellular RAN of the visited network, to the network selection operation, on the basis of a policy decided by the home network.

First Embodiment

Below, with reference to the drawing, embodiments will be described in a case where a cellular communication system (a LTE system) arranged in compliance with the 3GPP standards is worked in cooperation with a wireless LAN (WLAN) system.

(System Configuration)

FIG. 1 is a system configuration diagram according to the first embodiment. As shown in FIG. 1, the LTE system includes a plurality of UEs (User Equipments) 100, E-UTRAN (Evolved-UMTS Terrestrial Radio Access Network) 10, and EPC (Evolved Packet Core) 20. The E-UTRAN 10 corresponds to a radio access network (RAN). The EPC 20 corresponds to a core network.

The UE 100 is a mobile radio communication device and performs radio communication with a cell with which a connection is established. The UE 100 corresponds to the user terminal. The UE 100 is a terminal (dual terminal) that supports both communication schemes of cellular communication and WLAN communication.

The E-UTRAN 10 includes a plurality of eNBs 200 (evolved Node-Bs). The eNB 200 corresponds to a cellular base station. The eNB 200 manages one or more cells and performs radio communication with the UE 100 which establishes a connection with the cell of the eNB 200. It is noted that the "cell" is used as a term indicating a minimum unit of a radio communication area, and is also used as a term indicating a function of performing radio communication with the UE 100. Further, the eNB 200, for example, has a radio resource management (RRM) function, a routing function of user data, and a measurement control function for mobility control and scheduling.

The eNBs 200 are connected mutually via an X2 interface. Further, the eNB 200 is connected to MME/S-GW 500 included in the EPC 20 via an S1 interface.

The EPC 20 includes a plurality of MMEs (Mobility Management Entities)/S-GWs (Serving-Gateways) 500. The MME is a network node that performs various mobility controls and the like, for the UE 100 and corresponds to a control station. The S-GW is a network node that performs transfer control of user data and corresponds to a switching center.

The WLAN system includes WLAN access point (hereinafter referred to as "AP") 300. The WLAN system is configured in compliance with various IEEE 802.11 specifications, for example. The AP 300 communicates with the UE 100 in a frequency band (WLAN frequency band) different from a cellular frequency band. The AP 300 is connected to the EPC 20 via a router and the like.

However, it is not limited to the case in which the eNB 200 and the AP 300 are individually located. The eNB 200 and the AP 300 may also be collocated at the same place. The eNB 200 and the AP 300 may be directly connected to each other through an arbitrary interface of an operator, as one collocated configuration.

EPC 20 further includes an ANDSF server 600. The ANDSF server 600 manages information (hereinafter referred to as "ANDSF information") on WLAN. The ANDSF server 600 provides WLAN-associated information to the UE 100 by NAS messages.

Subsequently, a configuration of the UE 100, the eNB 200, and the AP 300 will be described.

Figure 2:
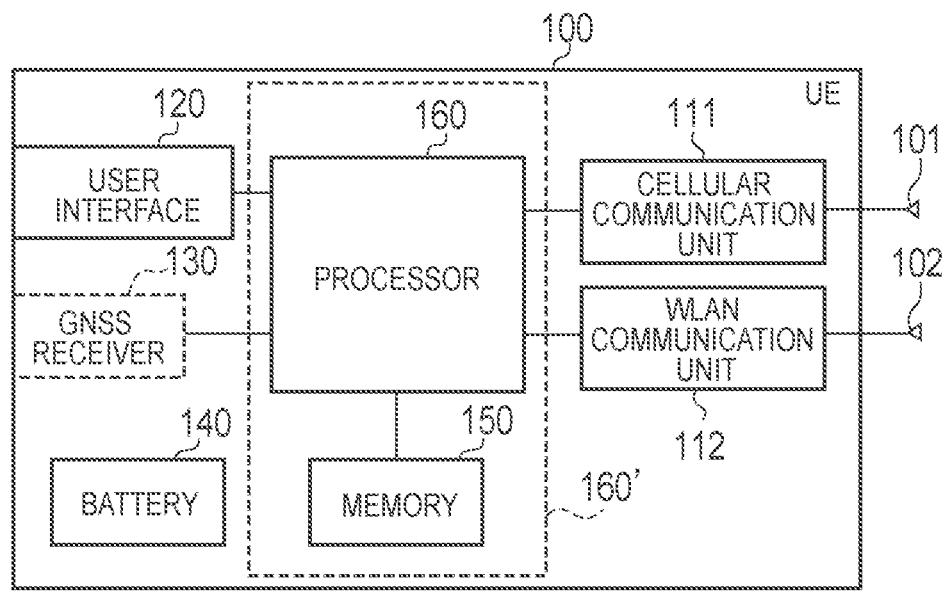
FIG. 2 is a block diagram of a UE (user terminal) according to the first to third embodiments.

FIG. 2 is a block diagram of the UE 100. As shown in FIG. 2, the UE 100 includes: antennas 101 and 102; a cellular communication unit 111; a WLAN communication unit 112; a user interface 120; a GNSS (Global Navigation Satellite System) receiver 130; a battery 140; a memory 150; and a processor 160. The memory 150 and the processor 160 constitute a controller. The UE 100 may not have the GNSS receiver 130. Furthermore, the memory 150 may be integrally formed with the processor 160, and this set (that is, a chipset) may be called a processor 160'.

The antenna 101 and the cellular communication unit 111 are used for transmitting and receiving cellular radio signals. The cellular communication unit 111 converts a baseband signal output from the processor 160 into the cellular radio signal, and transmits it from the antenna 101. Further, the cellular communication unit 111 converts the cellular radio signal received by the antenna 101 into the baseband signal, and outputs it to the processor 160.

The antenna 102 and the WLAN communication unit 112 are used for transmitting and receiving WLAN radio signals. The WLAN communication unit 112 converts the baseband signal output from the processor 160 into a WLAN radio signal, and transmits the same from the antenna 102. Further, the WLAN communication unit 112 converts the WLAN radio signal received by the antenna 102 into a baseband signal, and outputs it to the processor 160.

The user interface 120 is an interface with a user carrying the UE 100, and includes, for example, a display, a microphone, a speaker, and various buttons. Upon receipt of the input from a user, the user interface 120 outputs a signal indicating a content of the input to the processor 160. The GNSS receiver 130 receives a GNSS signal in order to obtain location information indicating a geographical location of the UE 100, and outputs the received signal to the processor 160. The battery 140 stores a power to be supplied to each block of the UE 100.

The memory 150 stores a program to be executed by the processor 160 and information to be used for a process by the processor 160. The processor 160 includes the baseband processor that performs modulation and demodulation, encoding and decoding and the like on the baseband signal and a CPU that performs various processes by executing the program stored in the memory 150. The processor 160 may further include a codec that performs encoding and decoding on sound and video signals. The processor 160 executes various processes and various communication protocols described later.

Figure 3:
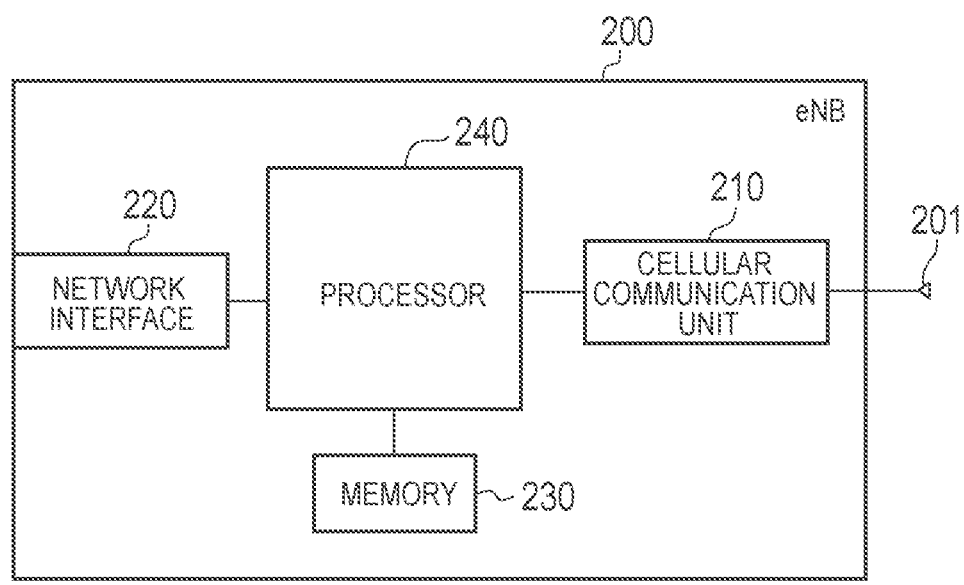
FIG. 3 is a block diagram of an eNB (cellular base station) according to the first to third embodiments.

FIG. 3 is a block diagram of the eNB 200. As shown in FIG. 3, the eNB 200 includes an antenna 201, a cellular communication unit 210, a network interface 220, a memory 230, and a processor 240. The memory 230 and the processor 240 constitute a controller.

The antenna 201 and the cellular communication unit 210 are used for transmitting and receiving cellular radio signals. The cellular communication unit 210 converts the baseband signal output from the processor 240 into the cellular radio signal, and transmits it from the antenna 201. Furthermore, the cellular communication unit 210 converts the cellular radio signal received by the antenna 201 into the baseband signal, and outputs it to the processor 240.

The network interface 220 is connected to the neighboring eNB 200 via the X2 interface and is connected to the MME/S-GW 500 via the S1 interface. Further, the network interface 220 is used for communication with the AP 300 via the EPC 20.

The memory 230 stores a program to be executed by the processor 240 and information to be used for a process by the processor 240. The processor 240 includes the baseband processor that performs modulation and demodulation, encoding and decoding and the like on the baseband signal and a CPU that performs various processes by executing the program stored in the memory 230. The processor 240 implements various processes and various communication protocols described later.

Figure 4:
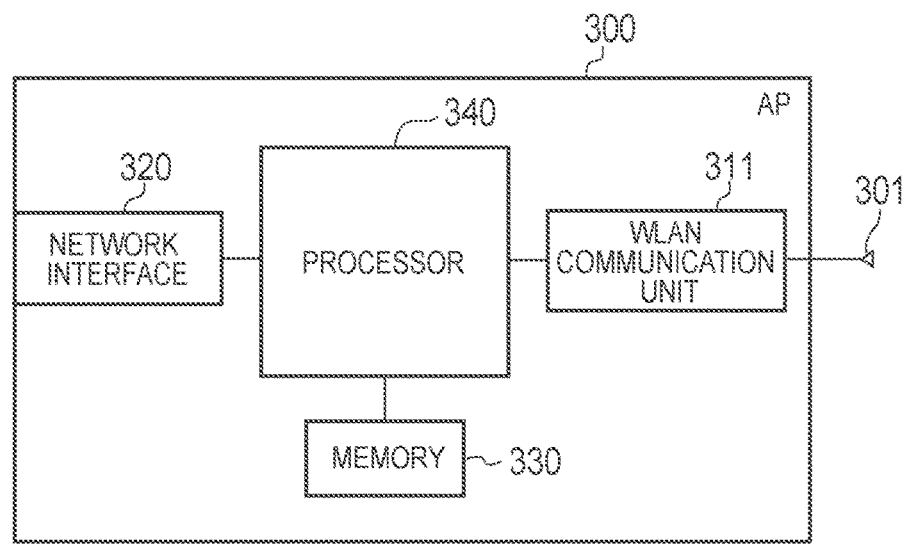
FIG. 4 is a block diagram of an AP (access point) according to the first to third embodiments.

FIG. 4 is a block diagram of the AP 300. As shown in FIG. 4, the AP 300 includes an antenna 301, a WLAN communication unit 311, a network interface 320, a memory 330, and a processor 340.

The antenna 301 and the WLAN communication unit 311 are used for transmitting and receiving WLAN radio signals. The WLAN communication unit 311 converts the baseband signal output from the processor 340 into the WLAN radio signal and transmits it from the antenna 301. Further, the WLAN communication unit 311 converts the WLAN radio signal received by the antenna 301 into the baseband signal and outputs it to the processor 340.

The network interface 320 is connected to the EPC 20 via a router, etc. Further, the network interface 320 is used for communication with the eNB 200 via the EPC 20.

The memory 330 stores a program to be executed by the processor 340 and information to be used for a process by the processor 340. The processor 340 includes the baseband processor that performs modulation and demodulation, encoding and decoding and the like on the baseband signal and a CPU that performs various processes by executing the program stored in the memory 330.

Figure 5:
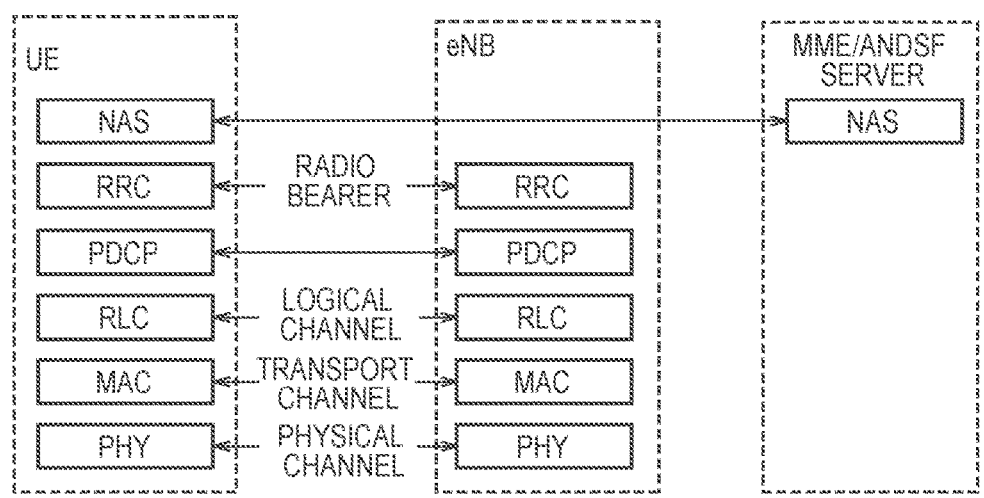
FIG. 5 is a protocol stack diagram of a radio interface in LTE system.

FIG. 5 is a protocol stack diagram of a radio interface in the cellular communication system. As shown in FIG. 5, the radio interface protocol is classified into a layer 1 to a layer 3 of an OSI reference model, wherein the layer 1 is a physical (PHY) layer. The layer 2 includes a MAC (Media Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, data is transmitted via physical channels.

The MAC layer performs priority control of data, and a retransmission process and the like by hybrid ARQ (HARQ). Between the MAC layer of the UE 100 and the MAC layer of the eNB 200, data is transmitted via transport channels. The MAC layer of the eNB 200 includes a scheduler that selects a transport format (a transport block size, a modulation and coding scheme and the like) of an uplink and a downlink, and resource blocks to be assigned.

The RLC layer transmits data to an RLC layer of a reception side by using the functions of the MAC layer and the PHY layer. Between the RLC layer of the UE 100 and the RLC layer of the eNB 200, data is transmitted via logical channels.

The PDCP layer performs header compression and decompression, and encryption and decryption.

The RRC layer is defined only in a control plane. Between the RRC layer of the UE 100 and the RRC layer of the eNB 200, a control message (an RRC message) for various settings is transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in a connected state (RRC connected mode), otherwise, the UE 100 is in an idle state (RRC idle mode).

A NAS layer positioned above the RRC layer performs session management, mobility management and the like. The MME 300 and the ANDSF server 600 exchange NAS messages with UE 100.

(Operation According to First Embodiment)

Next, the operation according to the first embodiment will be described.

(1) Operating Environment

Figure 6:
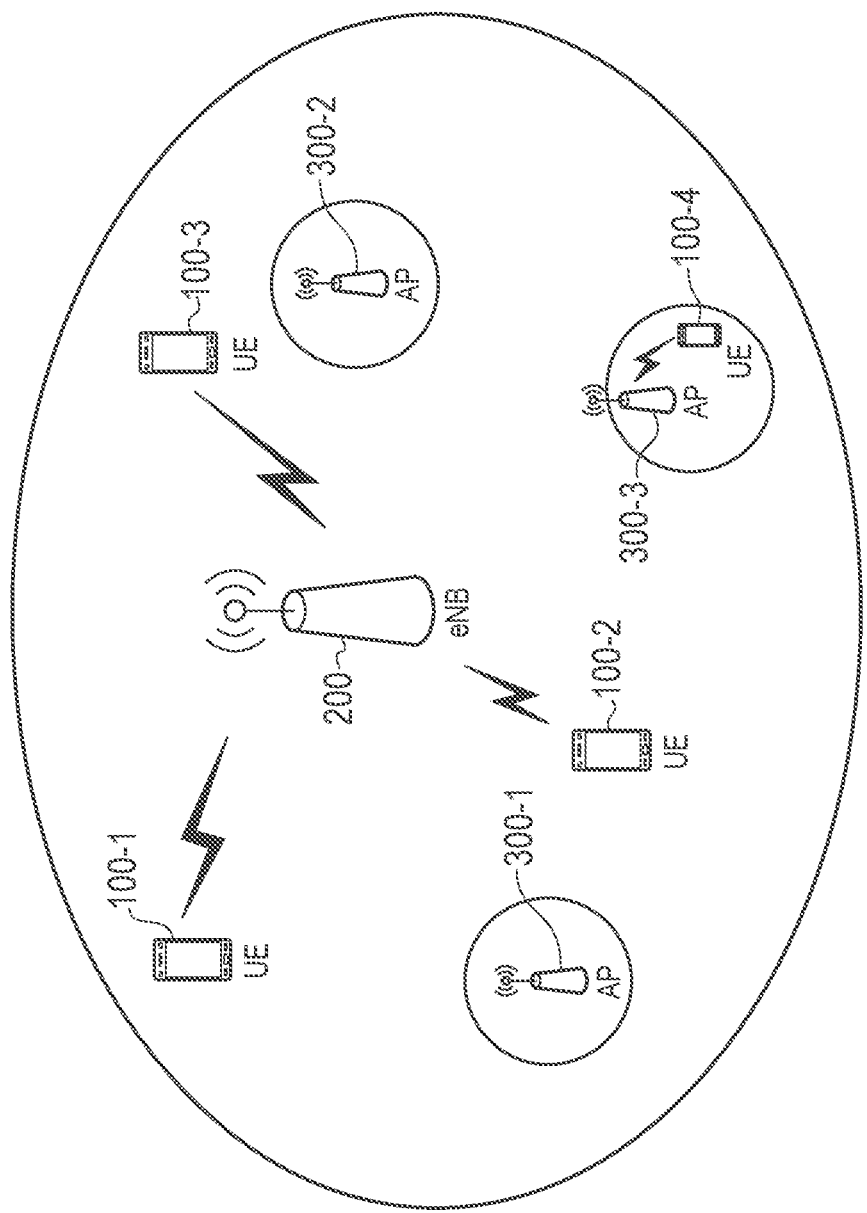
FIG. 6 is a diagram illustrating the operating environment according to the first to third embodiments.

FIG. 6 is a diagram illustrating the operating environment according to the first embodiment. As shown in FIG. 6, a plurality of APs 300 are arranged in the coverage of eNB 200. The AP 300 is AP controlled by an operator (operator controlled AP).

Moreover, UEs 100 are located in the coverage of the AP 200, in the coverage of the eNB 200. The UE 100 establishes a connection with the eNB 200, and performs a cellular communication with the eNB 200. Specifically, the UE 100 transmits and receives cellular radio signals including traffic (user data). Alternatively, some UEs 100 may not establish connections with the eNB 200.

When many UEs 100 establish connections with the eNB 200, the load level of the eNB 200 becomes higher. The load level refers to the congestion degree of the eNB 200 such as the traffic load of the eNB 200 or the resource usage ratio of the eNB 200. Here, it is possible to steer (offload) the traffic load of the eNB 200 to the AP 300 by switching the traffic exchanged between the eNB 200 and the UE 100 such that this traffic is exchanged between the AP 300 and the UE 100.

However, it is necessary to continue an AP discovery process by setting the WLAN communication unit 112 to an ON state at all times in order to keep the UE 100 a state connectable with the AP 300, thereby the power consumption of the UE 100 increases. Therefore, it is possible to make the AP discovery process performed by the UE 100 more efficient and to suppress the increment of the power consumption of the UE 100, by providing the information regarding the AP 300 to the UE 100.

(2) Operation Overview

Figure 7:
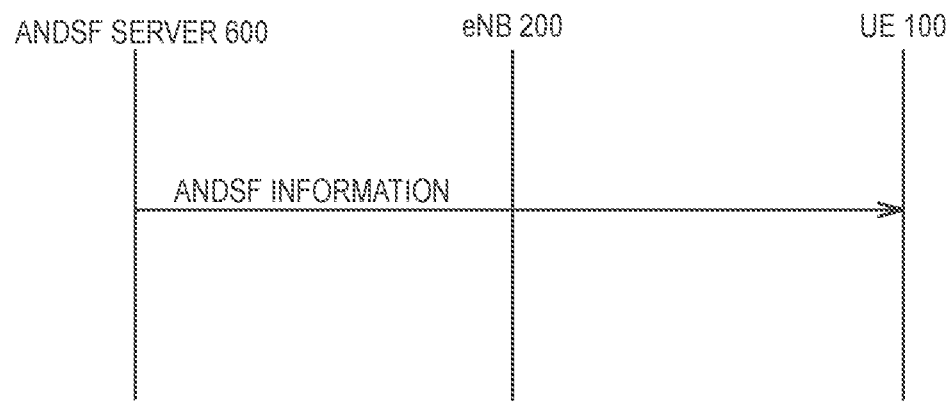
FIG. 7 is a diagram illustrating ANDSF information according to the first to third embodiments.

FIG. 7 is a diagram illustrating ANDSF information provided by the ANDSF server 600. As shown in FIG. 7, the ANDSF server 600 provides ANDSF information regarding the AP 300 to the UE 100 by a NAS message. The UE 100 can discover the AP 300 efficiently by performing the AP discovery process based on the ANDSF information.

It is note that the ANDSF is an optional function, hence all UEs 100 are not necessarily available the ANDSF. Moreover, the ANDSF is a NAS function and only provides basic information on WLAN. Therefore, it is difficult for the ANDSF alone to make the AP discovery process more efficient adequately.

Then, the first embodiment newly introduces RAN level assistance information (RAN level WLAN discovery assistance information) for discovering the AP 300 efficiently. The RAN level assistance information is managed by the eNB 200 and is provided by the eNB 200.

Figure 8:
FIG. 8 is a diagram illustrating the RAN level assistance information according to the first to third embodiments.

FIG. 8 is a diagram illustrating the RAN level assistance information. As shown in FIG. 8, the eNB 200 transmits, to the UE 100, the RAN level assistance information for efficiently discovering the AP 300 arranged in the coverage of the eNB 200, by a broadcast manner. This enables each UE 100 incapable of utilizing the ANDSF to perform AP discovery process based on the RAN level assistance information, thereby it is possible to discover the AP 300 efficiently.

The RAN level assistance information is a part of a system information block (SIB) because the RAN level assistance information is preferable to be received by not only a connected state UE 100 but also an idle state UE 100.

The RAN level assistance information transmitted by the eNB 200 includes information regarding each AP 300 within the coverage of the eNB 200. For example, the RAN level assistance information includes at least one of the identifier of AP 300, the location information of AP 300, and the channel information of AP 300.

The identifier of AP 300 is SSID (Service Set Identifier) or BSSID (Basic Service Set Identifier).

The location information of AP 300 is longitude and latitude of AP 300. However, a plurality of APs 300 may be arranged in the same building. Therefore, it is preferable to include altitude of AP 300 because the longitude and latitude of AP 300 is not enough.

The channel information of AP 300 is information on WLAN channel (frequency channel) operated by the AP 300.

Moreover, the RAN level assistance information may include information regarding timing (measurement timing) at which the AP discovery process is performed.

The UE 100 may not necessarily receive (acquire) the broadcasted RAN level assistance information. For example, the UE 100 capable of utilizing the ANDSF may not hope to receive the RAN level assistance information or not apply the received RAN level assistance information to the AP discovery process because the UE 100 can acquire the ANDSF information (WLAN-associated information) managed by the ANDSF server 600.

However, the RAN level assistance information is more detail information than the ANDSF information and enables more efficient AP discovery process than the ANDSF information. Therefore, all UEs 100 should apply the RAN level assistance information to the AP discovery process when the offload for steering the traffic load to the AP 300 is highly required.

In the first embodiment, the eNB 200 prompts the UE 100 to apply the RAN level assistance information, by the offload indication information.

Figure 9:
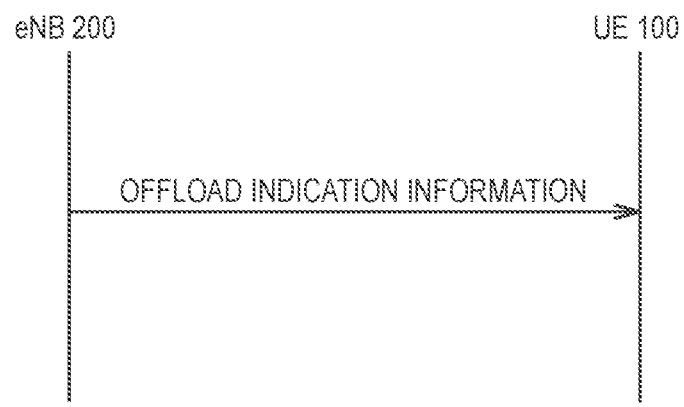
FIG. 9 is a diagram illustrating the offload indication information according to the first embodiment.

FIG. 9 is a diagram illustrating the offload indication information. As shown in FIG. 9, the eNB 200 broadcasts the offload indication information for requesting the UE 100 to apply the RAN level assistance information to the AP discovery process, in a case where the eNB 200 performs the offload. For example, this case refers to a case where the load level of eNB 200 becomes high (i.e., the congestion in eNB 200 occurs).

Thereby, each UE 100 within the coverage of the eNB 200 discover AP 300 efficiently by applying the RAN level assistance information to the AP discovery process. As a result, it is possible to prompt the offload toward the AP 300.

The RAN level assistance information is a part of the SIB because the RAN level assistance information is preferable to be received by not only a connected state UE 100 but also an idle state UE 100.

The RAN level assistance information and the offload indication information may be configured by not only different messages but also different information elements within the same message.

(3) Operation Pattern 1

Next, the operation pattern 1 of the first embodiment will be described.

Figure 10:
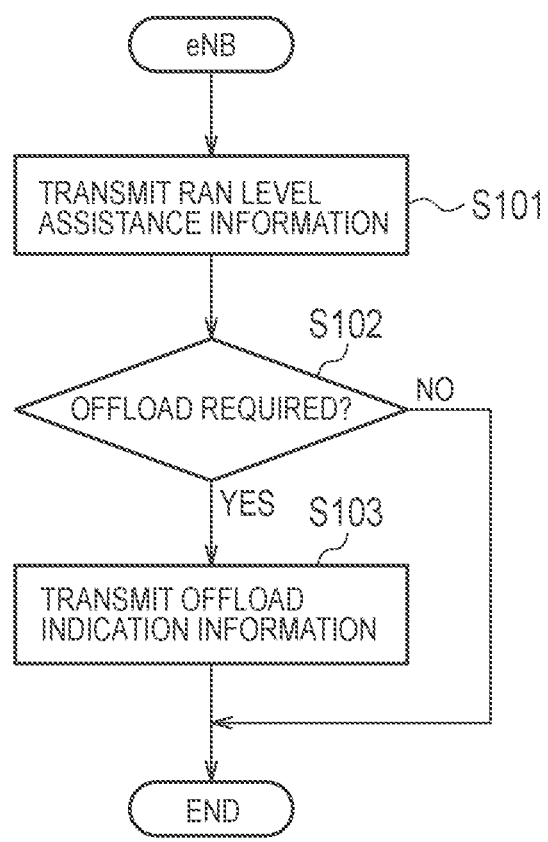
FIG. 10 is an operation flow diagram of the eNB in the operation patterns 1 and 2 of the first embodiment.

FIG. 10 is an operation flow diagram of the eNB 200 in the operation pattern 1 of the first embodiment. This operation flow is periodically performed by the eNB 200.

As shown in FIG. 10, in step S101, the processor 240 of the eNB 200 transmits the RAN level assistance information by broadcast manner.

In step S102, the processor 240 determines whether to perform the offload. For example, the processor 240 determines to perform the offload when the load level of the eNB is high.

When performing the offload (step S102: Yes), in step S103, the processor 240 transmits the offload indication information by broadcast manner.

For example, when the load level of the eNB decreases sufficiently after starting the transmission of the offload indication information, the processor 240 determines not to perform the offload (offload stopping) (step S102). In this case, the processor 240 stops the transmission of the offload indication information.

Figure 11:
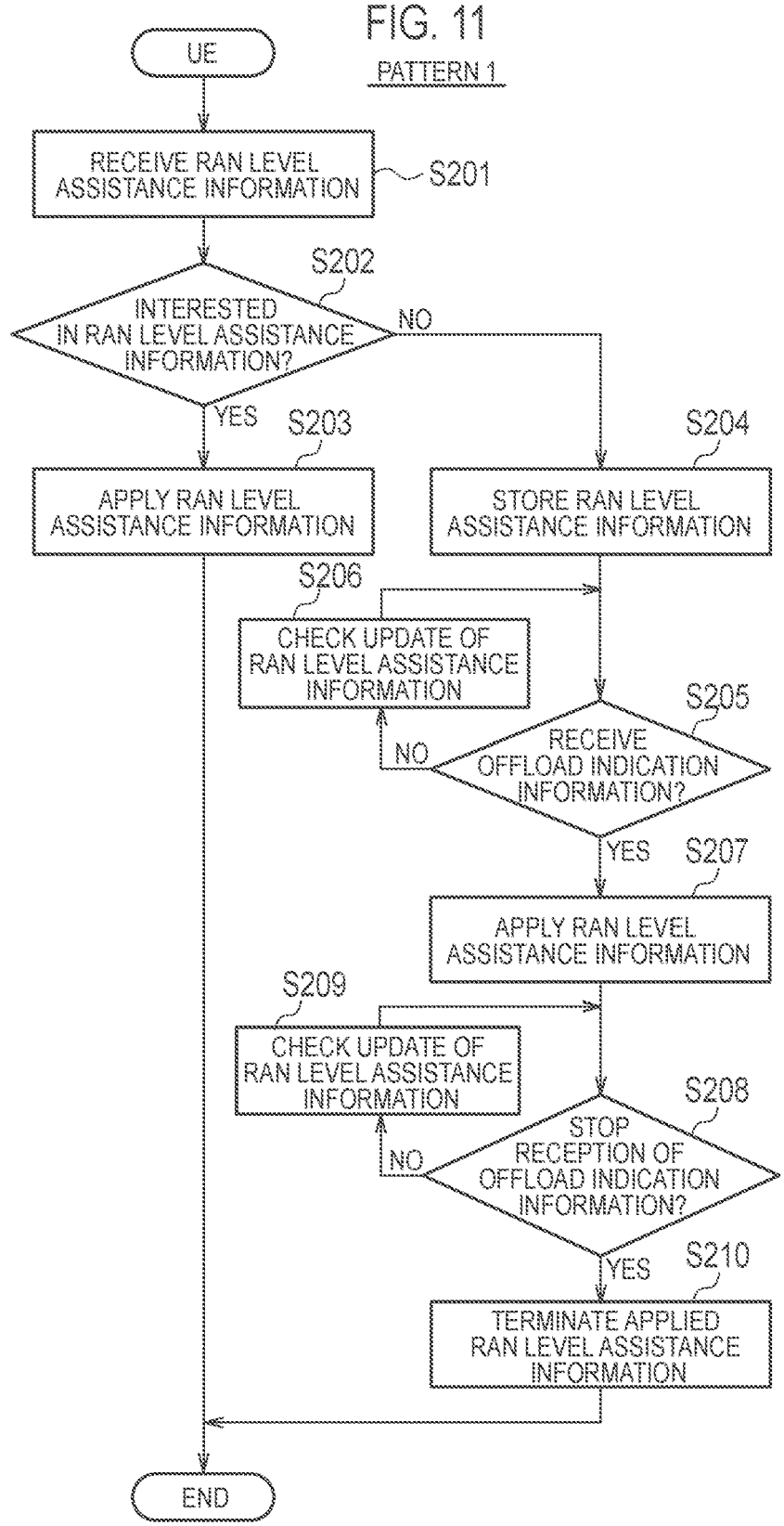
FIG. 11 is an operation flow diagram of the UE in the operation pattern 1 of the first embodiment.

FIG. 11 is an operation flow diagram of the UE 100 in the operation pattern 1 of the first embodiment.

As shown in FIG. 11, in step S201, the processor 160 of the UE 100 receives the RAN level assistance information by the cellular communication unit 111.

In step S202, the processor 160 determines whether to have an interest in the RAN level assistance information. The UE 100 not having an interest in the RAN level assistance information refers to the UE 100 capable of utilizing the ANDSF, for example. On the other hand, the UE 100 having an interest in the RAN level assistance information refers to the UE 100 incapable of utilizing the ANDSF, for example.

When the UE 100 has an interest in the RAN level assistance information (step S202: Yes), in step S203, the processor 160 applies the RAN level assistance information to the AP discovery process. Specifically, the processor 160 uses the RAN level assistance information as setting information (Configuration). When the processor 160 subsequently receives the RAN level assistance information, the processor 160 newly applies the received RAN level assistance information to the AP discovery process. That is, the setting information (Configuration) is updated.

On the other hand, the UE 100 does not have an interest in the RAN level assistance information (step S202: No), in step S204, the processor 160 stores the RAN level assistance information into the memory 150 without applying the AP discovery process.

In step S205, the processor 160 determines whether the offload indication information is received.

When the offload indication information is not received (step S205: No), in step S206, the processor 160 (periodically) monitors the RAN level assistance information transmitted by the eNB 200, and checks whether the RAN level assistance information is updated. When the RAN level assistance information is updated, the processor 160 updates the RAN level assistance information within the memory 150 by the updated RAN level assistance information.

On the other hand, when the offload indication information is received (step S205: Yes), in step S207, the processor 160 applies the RAN level assistance information stored in the memory 150 to the AP discovery process, instead of the ANDSF information. Specifically, the processor 160 uses the RAN level assistance information stored in the memory 150 as setting information (Configuration).

In step S208, the processor 160 determines whether the offload indication information is stopped (reception stopped). In other words, the processor 160 determines whether the broadcast of the offload indication information by the eNB 200 is stopped.

When the offload indication information is not stopped (step S208: No), in step S209, the processor 160 (periodically) monitors the RAN level assistance information transmitted by the eNB 200, and checks whether the RAN level assistance information is updated. When the RAN level assistance information is updated, the processor 160 applies the updated RAN level assistance information to the AP discovery process. Specifically, the processor 160 updates the setting information (Configuration) by the updated RAN level assistance information.

On the other hand, the offload indication information is stopped (step S208: Yes), in step S210, the processor 160 cancels the application of the RAN level assistance information, and stores the applied RAN level assistance information into the memory 150. The processor 160 may restart (Reconfiguration) the application of the ANDSF information.

As described above, in the operation pattern 1, all UEs 100 receive the RAN level assistance information regardless of the availability of the ANDSF. The UE 100 not having an interest in the RAN level assistance information stores the RAN level assistance information from the eNB 200, without applying the RAN level assistance information to the AP discovery process. Then, the UE 100 applies the stored RAN level assistance information to the AP discovery process when receiving the offload indication information from the eNB 200. Then, the UE 100 cancels the application of the RAN level assistance information to the AP discovery process when detecting the transmission stop of the offload indication information. On the other hand, the UE 100 having an interest in the RAN level assistance information applies the RAN level assistance information to the AP discovery process even when the offload indication information is not received.

(4) Operation Pattern 2

Figure 12:
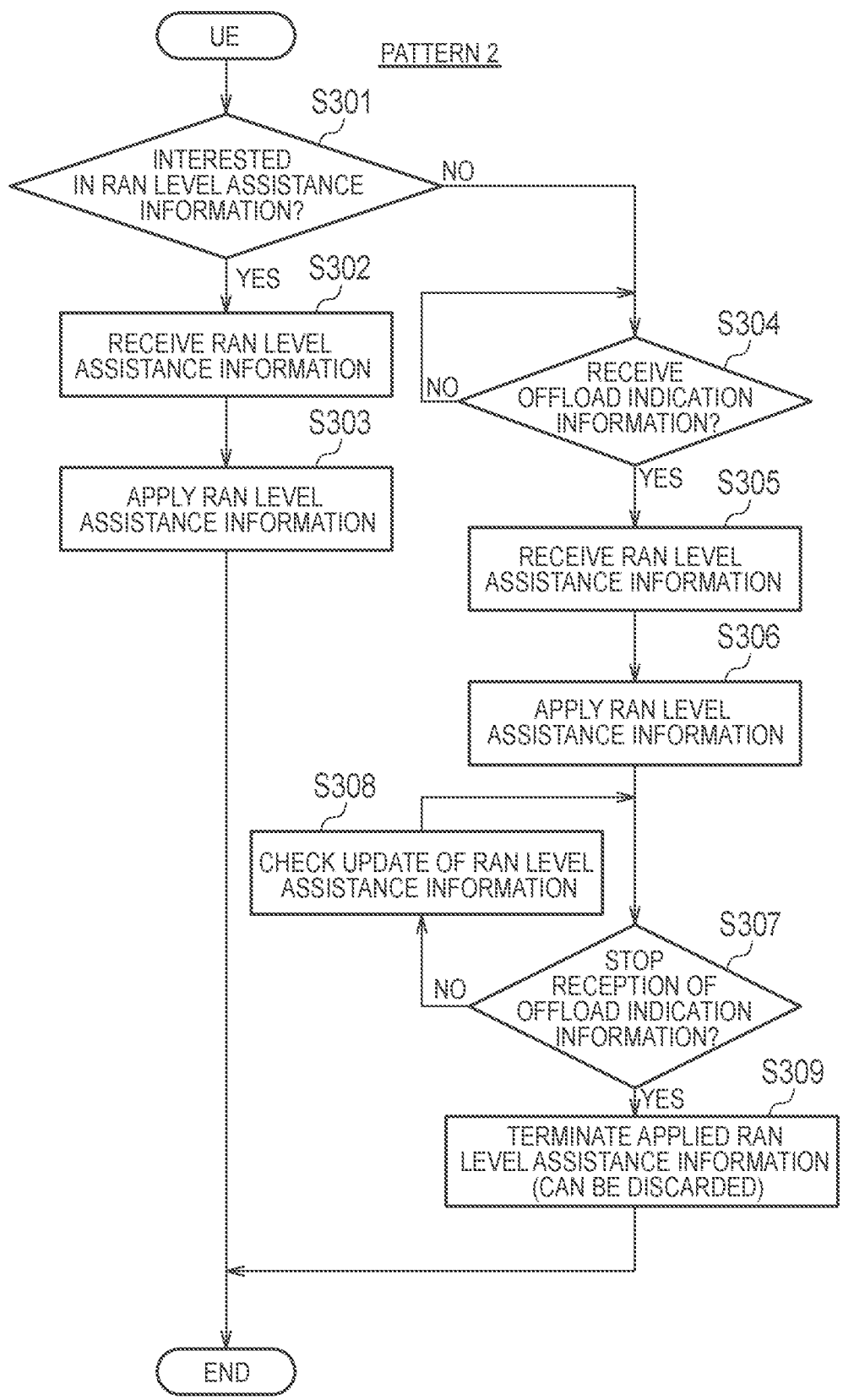
FIG. 12 is an operation flow diagram of UE 100 in the operation pattern 2 of the first embodiment.

Next, the operation pattern 2 of the first embodiment will be described. Here, the operation of UE 100 will be described because the operation of eNB 200 is similar to the operation pattern 1. FIG. 12 is an operation flow diagram of UE 100 in the operation pattern 2 of the first embodiment.

As shown in FIG. 12, in step S301, the processor 160 of UE 100 determines whether to have an interest in the RAN level assistance information. The UE 100 not having an interest in the RAN level assistance information refers to the UE 100 capable of utilizing the ANDSF, for example. On the other hand, the UE 100 having an interest in the RAN level assistance information refers to the UE 100 incapable of utilizing the ANDSF, for example.

When the UE 100 has an interest in the RAN level assistance information (step S301: Yes), in step S302, the processor 160 receives the RAN level assistance information by the cellular communication unit 111. Then, in step S303, the processor 160 applies the RAN level assistance information to the AP discovery process. Specifically, the processor 160 uses the RAN level assistance information as setting information (Configuration). When the processor 160 subsequently receives the RAN level assistance information, the processor 160 newly applies the received RAN level assistance information to the AP discovery process. That is, the setting information (Configuration) is updated.

On the other hand, the UE 100 does not have an interest in the RAN level assistance information (step S301: No), in step S304, the processor 160 determines whether the offload indication information is received.

When the offload indication information is received (step S304: Yes), in step S305, the processor 160 receives the RAN level assistance information by the cellular communication unit 111. Then, in step S306, the processor 160 applies the RAN level assistance information to the AP discovery process. Specifically, the processor 160 uses the RAN level assistance information as setting information (Configuration).

In step S307, the processor 160 determines whether the offload indication information is stopped (reception stopped). In other words, the processor 160 determines whether the broadcast of the offload indication information by the eNB 200 is stopped.

When the offload indication information is not stopped (step S307: No), in step S308, the processor 160 (periodically) monitors the RAN level assistance information transmitted by the eNB 200, and checks whether the RAN level assistance information is update. When the RAN level assistance information is updated, the processor 160 applies the updated RAN level assistance information to the AP discovery process. Specifically, the processor 160 updates the setting information (Configuration) by the updated RAN level assistance information.

On the other hand, the offload indication information is stopped (step S307: Yes), in step S309, the processor 160 cancels the application of the RAN level assistance information. The processor 160 may discard the applied RAN level assistance information. Moreover, the processor 160 may restart (Reconfiguration) the application of the ANDSF information.

As described above, in the operation pattern 2, the UE 100 not having an interest in the RAN level assistance information does not receive the RAN level assistance information until the UE 100 receives the offload indication information from the eNB 200. Then, the UE 100 receives the RAN level assistance information and applies the received RAN level assistance information to the AP discovery process when the UE 100 receives the offload indication information. Therefore, the operation pattern 2 can reduce the usage of the memory 150 compared with the operation pattern 1.

(Conclusion of First Embodiment)

The eNB 200, that performs the offload, transmits the offload indication information for requesting the UE 100 to apply the RAN level assistance information to the AP discovery process, by broadcast manner. The UE 100 applies the RAN level assistance information to the AP discovery process when the UE 100 receives the offload indication information, even when the UE 100 does not have an interest in the RAN level assistance information. This enables each UE 100 within the coverage of the eNB 200 to apply the RAN level assistance information to the AP discovery process. Therefore, the UE 100 can efficiently discover AP 300, thereby it is possible to prompt the offload toward the AP 300.

Second Embodiment

The second embodiment will be described while focusing on differences with aforementioned first embodiment. The system configuration and operation environment of the second embodiment are similar to the first embodiment.

(Operation According to Second Embodiment)

The operation according to the second embodiment will be described below.

(1) Operation Overview

In the second embodiment, the UE 100 transmits a request information (hereinafter referred to as "RAN level assistance information request") for requesting the transmission of the RAN level assistance information, to the eNB 200. The information elements of the RAN level assistance information are similar to the first embodiment. Note that the RAN level assistance information request may be regarded as an interest indication that indicates the interest in the RAN level assistance information.

The eNB 200, that receives the RAN level assistance information request, transmits the RAN level assistance information by unicast manner. For example, the unicast transmission of the RAN level assistance information can be achieved by transmitting the RAN level assistance information using a RRC message.

As described above, in the second embodiment, the RAN level assistance information is transmits to each UE 100 individually, unlike the first embodiment. Therefore, it is possible to provide the RAN level assistance information minutely, compared with the first embodiment.

(2) Operation Pattern 1

Figure 13:
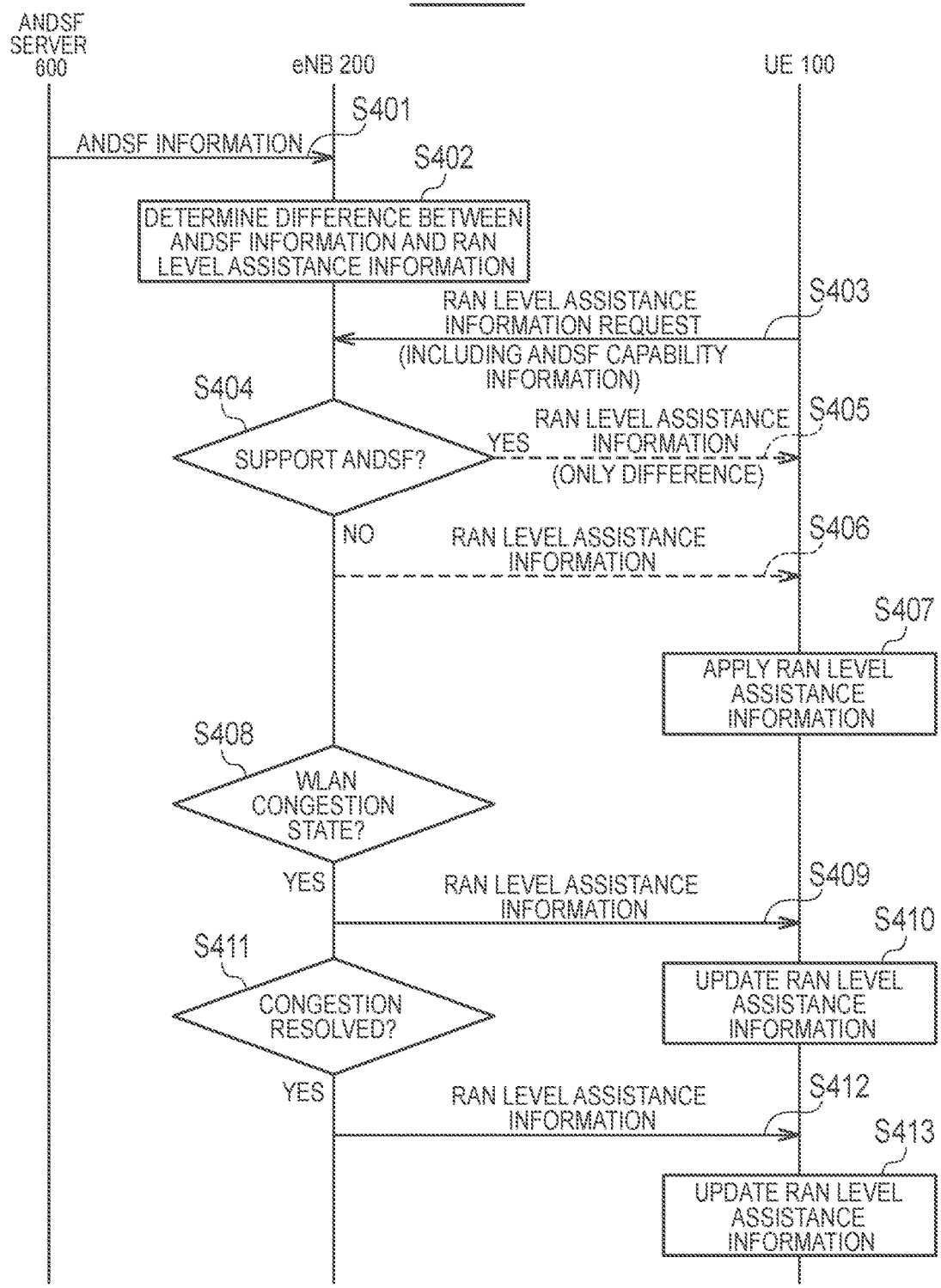
FIG. 13 is a sequence diagram in the operation pattern 1 of the second embodiment.

FIG. 13 is a sequence diagram in the operation pattern 1 of the second embodiment.

As shown in FIG. 13, in step S401, the eNB 200 acquires the ANDSF information from the ANDSF server 600. The ANDSF information may include the identifier of the AP 300 and the location information (except for altitude) of the AP 300. The eNB 200 may acquire the ANDSF information from the ANDSF server 600 directly, or acquire the ANDSF information indirectly. For example, the eNB 200 may acquire the ANDSF information via a node (e.g., OAM or MME) included in the core network.

In step S402, the eNB 200 determines the differences between the ANDSF information and the RAN level assistance information. That is, the eNB 200 extracts a portion (e.g., channel information and altitude information) not included in the ANDSF information, from the RAN level assistance information.

In step S403, the UE 100 transmits the RAN level assistance information request to the eNB 200. In the operation pattern 1, the UE 100 transmits the ANDSF capability information indicating whether the ANDSF is supported (or indicating whether the ANDSF is available), with the RAN level assistance information request. Furthermore, the UE 100 may transmit the own location information with the RAN level assistance information request, to the eNB 200.

In step S404, the eNB 200 determines whether the UE 100 supports the ANDSF based on the ANDSF capability information.

When the UE 100 supports the ANDSF (step S404: Yes), in step S405, the eNB 200 transmits only a portion not included in the ANDSF information among the RAN level assistance information, to the UE 100 by unicast manner.

When the UE 100 does not supports the ANDSF (step S404: No), in step S406, the eNB 200 transmits all of the RAN level assistance information to the UE 100 by unicast manner.

When the eNB 200 receives the location information of the UE 100 in step S403, in step S405 or S406, the eNB 200 may transmit only a portion associated with AP 300 close to the UE 100 among the RAN level assistance information, to the UE 100 by unicast manner.

In step S407, the UE 100, that receives the RAN level assistance information (portion or entirety), applies the received RAN level assistance information to the AP discovery process. Specifically, the UE 100 uses the RAN level assistance information as setting information (Configuration).

In step S408, the eNB 200 determines whether there is an AP 300 for which the reduction of load level is required within the own coverage. The AP 300 for which the reduction of load level is required refers to an AP 300 in which the congestion occurs (or in a state near to the congestion), for example. Below, an AP 300 in which the congestion occurs is exemplified as the AP 300 for which the reduction of load level is required.

When the congestion and the like occurs in AP 300 within the coverage (step S408: Yes), in step S409, the eNB 200 transmits a new RAN level assistance information to the UE 100 by unicast manner. The new RAN level assistance information refers to RAN level assistance information configured to restrict the AP discovery process for the AP 300 in which the congestion occurs. For example, this may be RAN level assistance information with the exception of information on the AP 300 in which the congestion occurs.

In step S410, the UE 100, that receives the new RAN level assistance information, applies the received RAN level assistance information to the AP discovery process. Specifically, the UE 100 uses the new RAN level assistance information as updated setting information (Configuration).

In step S411, the eNB 200 determines whether the congestion in the AP 300 is resolved.

When the congestion in the AP 300 is resolved (step S411: Yes), in step S412, the eNB 200 transmits normal RAN level assistance information to the UE 100 by unicast manner. The normal RAN level assistance information refers to RAN level assistance information configured not to restrict the AP discovery process for the AP 300 in which the congestion is resolved.

In step S413, the UE 100, that receives the normal RAN level assistance information, applies the received RAN level assistance information to the AP discovery process. Specifically, the UE 100 uses the normal RAN level assistance information as updated setting information (Configuration).

As described above, in the operation pattern 1 of the second embodiment, the UE 100 supporting the ANDSF transmits the capability information indicating that the UE 100 supports the ANDSF, with RAN level assistance information request, to the eNB 200. The eNB 200, that receives the capability information with the RAN level assistance information request, transmits a portion not included in the ANDSF information among the RAN level assistance information to the UE 100.

(3) Operation Pattern 2

Figure 14:
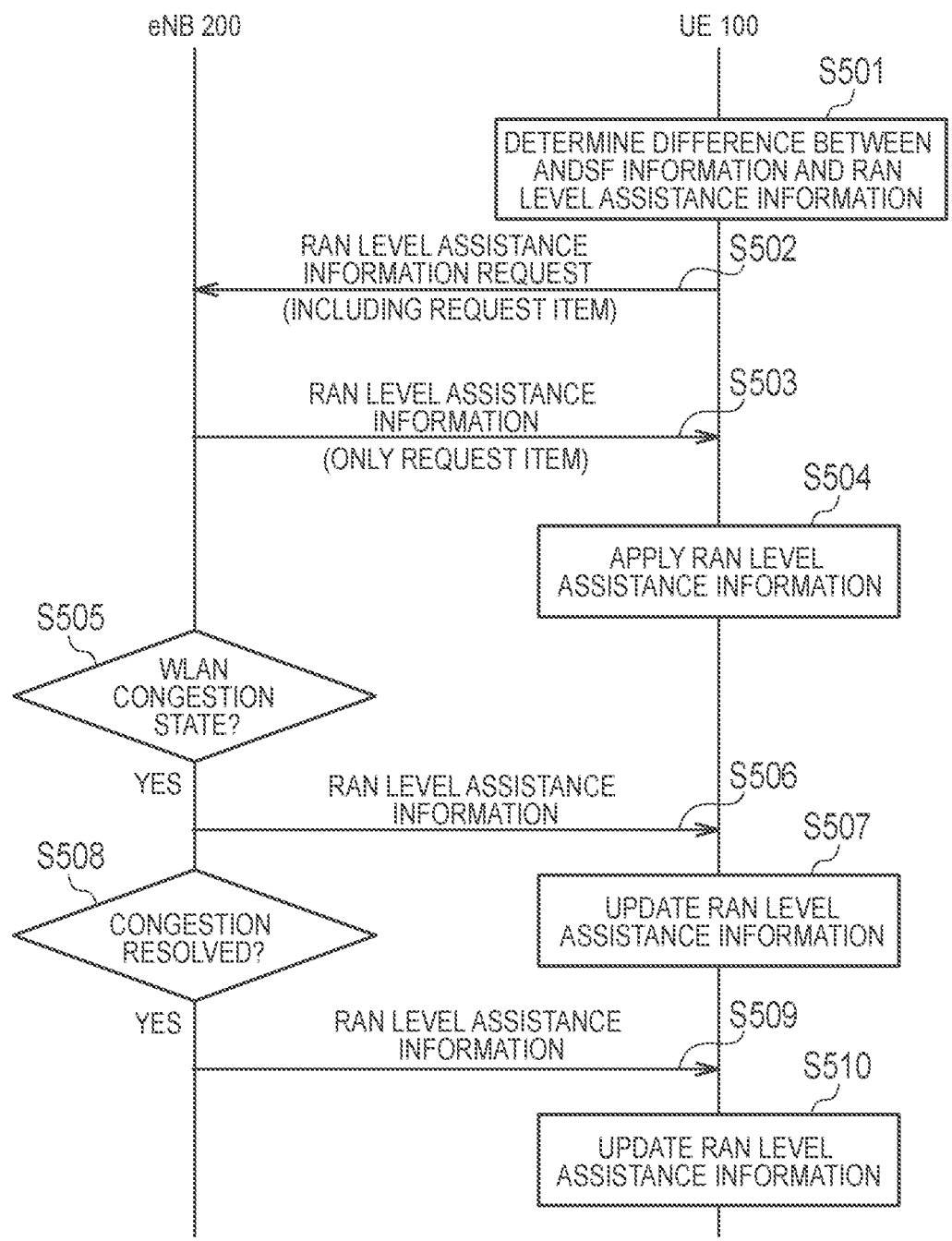
FIG. 14 is a sequence diagram in the operation pattern 2 of the second embodiment.

FIG. 14 is a sequence diagram in the operation pattern 2 of the second embodiment.

As shown in FIG. 14, in step S501, the UE 100 determines differences between the ANDSF information and the RAN level assistance information. That is, the UE 100 extracts a portion (e.g., channel information and altitude information) not included in the ANDSF information as a request item, from the RAN level assistance information.

In step S502, the UE 100 transmits the RAN level assistance information request to the eNB 200. In the operation pattern 2, the UE 100 transmits the request item indicating a portion not included in the ANDSF information among the RAN level assistance information, with the RAN level assistance information request, to the eNB 200. Furthermore, the UE 100 may transmits the own location information with the RAN level assistance information request, to the eNB 200.

In step S503, the eNB 200, that receives the request item with the RAN level assistance information request, transmits only a portion corresponding to the request item, to the UE 100 by unicast manner. When the eNB 200 receives the location information of the UE 100 in step S502, in step S503, the eNB 200 transmits only a portion associated with the AP 300 near to the UE 100 among RAN level assistance information, to the UE 100 by unicast manner.

In step S504, the UE 100, that receives the RAN level assistance information (portion corresponding to the request item), applies the received RAN level assistance information to the AP discovery process. Specifically, the UE 100 uses the RAN level assistance information as setting information (Configuration).

In step S505, the eNB 200 determines whether there is an AP 300 for which the reduction of load level is required within the own coverage. The subsequent operations (steps S506 to S510) are similar to the operation pattern 1.

As described above, in the operation pattern 2 of the second embodiment, the UE 100 supporting the ANDSF transmits the request item indicating a portion not included in the ANDSF information among the RAN level assistance information, with the RAN level assistance information request, to the eNB 200. The eNB 200, that receives the request item with the RAN level assistance information request, transmits the portion corresponding to the request item among the RAN level assistance information, to the UE 100.

(4) Operation Pattern 3

Figure 15:
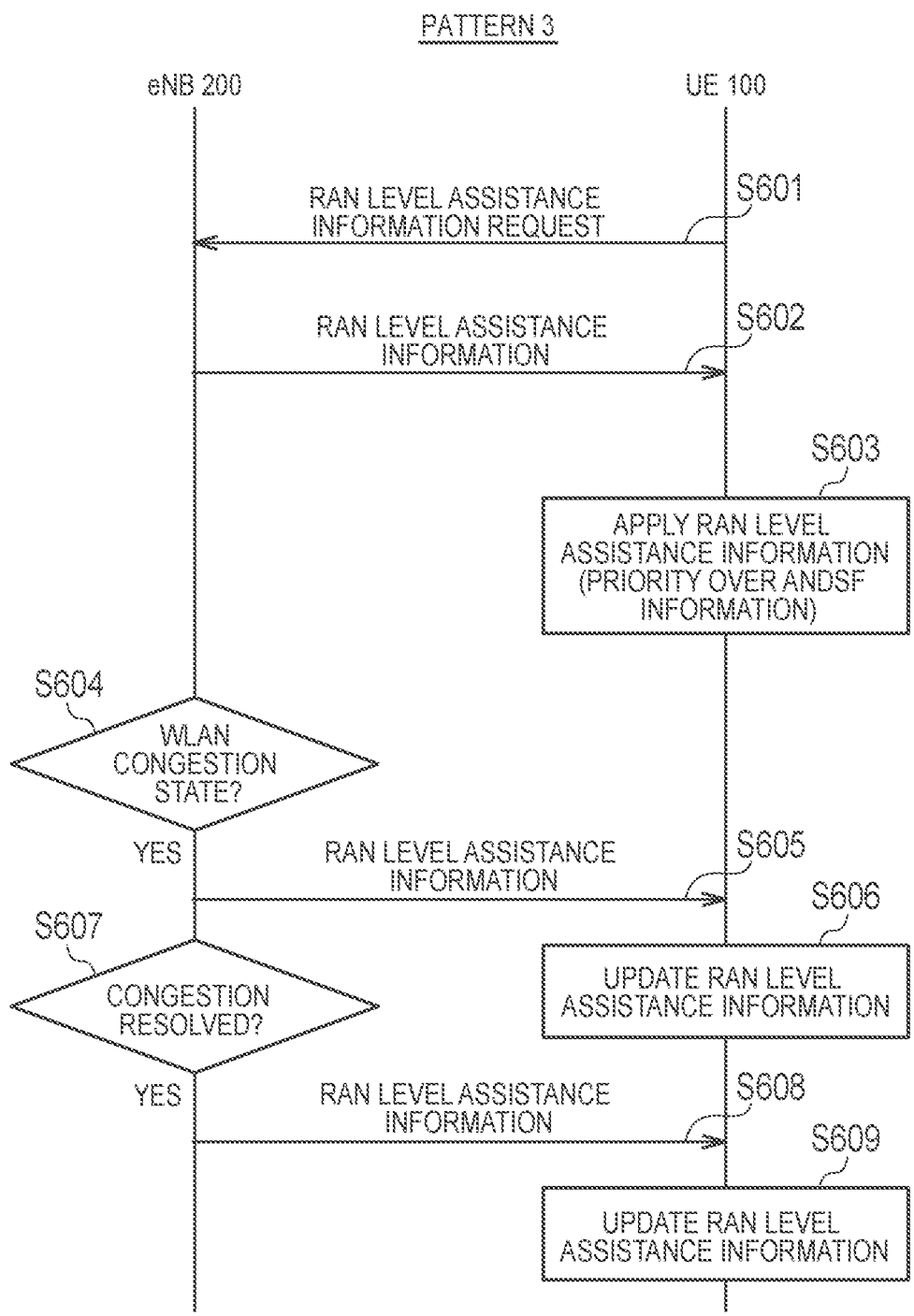
FIG. 15 is sequence diagram in the operation pattern 3 of the second embodiment.

FIG. 15 is sequence diagram in the operation pattern 3 of the second embodiment.

As shown in FIG. 15, in step S601, the UE 100 transmits the RAN level assistance information request to the eNB 200. UE 100 may transmit the own location information with RAN level assistance information request to the eNB 200.

In step S602, the eNB 200, that receives the RAN level assistance information request, transmits RAN level assistance information to the UE 100 by unicast manner. When the eNB 200 receives the location information of the UE 100 in step S601, in step S602, the eNB 200 transmits only a portion associated with the AP 300 near to the UE 100 among RAN level assistance information, to the UE 100 by unicast manner.

In step S603, the UE 100, that receives the RAN level assistance information, applies the received RAN level assistance information to the AP discovery process. Specifically, the UE 100 uses the RAN level assistance information as setting information (Configuration). Here, the UE 100 supporting the ANDSF preferentially applies the RAN level assistance information to the AP discovery process over the ANDSF information.

In step S604, the eNB 200 determines whether there is an AP 300 for which the reduction of load level is required within the own coverage. The subsequent operations (steps S605 to S609) are similar to the operation pattern 1.

As described above, in the operation pattern 3 of the second embodiment, the UE 100 supporting the ANDSF preferentially applies, to the AP discovery process, the RAN level assistance information received from the eNB 200 over the ANDSF information.

(Conclusion of Second Embodiment)

The UE 100 transmits the RAN level assistance information request to the eNB 200. The eNB 200, that receives the RAN level assistance information request, transmits the RAN level assistance information to the UE 100 by unicast manner. That is, the RAN level assistance information is transmits to each UE 100 individually, thereby it is possible to provide the RAN level assistance information minutely.

[Modification of Second Embodiment]

In aforementioned second embodiment, the eNB 200, that receives the RAN level assistance information request from the UE 100, may utilize the RAN level assistance information request to a handover for the UE 100.

In the modification of the second embodiment, the eNB 200 transmits, to a neighbor eNB 200, UE-associated information (UE context) indicating that the UE 100 requests the transmission of the RAN level assistance information when performing a handover to the neighbor eNB 200. Such UE-associated information may be a part of a handover request transmitted to the neighbor eNB 200 on the X2 interface. Then the neighbor eNB 200, that receives the UE-associated information, transmits the RAN level assistance information for efficiently discover the AP 300 arranged in the coverage of itself (neighbor eNB 200) to the UE 100 when the UE 100 connects to itself (neighbor eNB 200). Therefore, it is possible to transmit the RAN level assistance information to the UE 100 during a RRC connection establishment procedure.

[Additional Statements of First and Second Embodiments]

Additional statements of aforementioned first and second embodiments will be described below.

(Overview)

Various solutions were proposed for access network discovery assistance information. Some solutions may depend on availability of ANDSF while others depend only on RAN (E-UTRAN 10/eNB 200) assistance. Below, the solutions based on the network complexity and the reduction in UE power consumption will be categorized.

There are opinions that the network selection and WLAN scanning/discovery should be discussed separately. For the issue of network selection, it is often assumed that UE 100's WLAN radio is turned on and the UE 100 is constantly scanning for available WLAN APs 300. In contrast, WLAN scanning/discovery optimization does not assume the UE 100 is always scanning for potential WLAN APs 300. Therefore, we believe WLAN scanning/discovery optimization should not be considered after the solution for network selection is finalized.

It is understood that ANDSF can provide WLAN access network discovery information at cell resolution or precise coordinates; however, the ANDSF is not always available to the UE 100. In the case ANDSF isn't available to the UE 100, assistance information from the RAN may be needed in order to reduce UE 100 power consumption to a reasonable level. Even if ANDSF information is available to the UE 100, further assistance from the RAN may still be helpful. Regardless of whether the assistance information is received from ANDSF or the RAN or both, it is FFS whether we need to define the UE 100 behavior and specify any UE requirements.

In the discussions below, WLAN scanning/discovery optimization is categorized into three phases. Phase 1 is meant to have the least complexity for the network while still providing sufficient information to reduce UE power consumption. Phase 2 provides additional information to further reduce unnecessary searching and scanning Phase 3 provides the most amount of assistance to the UE 100 and power consumption may be drastically reduced, but at increased network complexity. Phases 1 and 2 are applicable to UEs in both IDLE (idle) and CONN (connected), while phase 3 is only applicable to UEs 100 in CONN.

(Phase 1: Broadcast Assistance)

One of the main reasons for the UE 100 to access WLAN is to allow the 3GPP node to offload traffic to WLAN for load balancing. For example, it may be assumed that RAN would offload traffic to WLAN as much as possible if the RAN is congested. In some cases, the user or the UE 100 may have turned off the WLAN radio or more generally operate under the "energy efficient" mode to conserve power. If the UE 100 doesn't know the 3GPP node's intention for offloading, there may be little reason for the UE 100 to stop applying the energy efficient mode. Therefore, it would be beneficial for the 3GPP node to indicate its intention for offloading to the UE 100. Sufficient offloading gain may not be achieved if the UE 100 remains in the energy efficient mode. Similarly, for example, once the RAN's loading returns to normal and offloading is not so important, RAN should inform the UEs 100 of the updated 3GPP node's intention so that the UEs 100 may activate the energy efficient mode based on the user or UE's preference. Such an indication would be complementary to any of the proposed assistance mechanisms. This indication is only meant for WLAN discovery. It is FFS whether additional information is needed for network selection, in particular, the issue of mass toggling is also FFS.

Therefore, 3GPP node should have a mechanism to inform the UE 100 of intention for offloading to WLAN.

(Phase 2: Enhanced Broadcast Assistance)

In addition to the solution proposed in phase 1, we could further consider to allow the 3GPP node to broadcast HESSID, SSID, BSSID along with the associated channel information of the AP(s) 300 that is available within the coverage of the 3GPP node. The association of an AP 300 with the 3GPP Cell is already available as part of ANDSF. However, ANDSF may or may not be available. So a solution should also work in case ANDSF is unavailable. The WLAN identities broadcasted by the 3GPP node are also consistent with ANDSF, the solution will not conflict with ANDSF. This information can further allow the UE 100 to determine which AP 300 to try and scan or detect.

Therefore, 3GPP node should broadcast scanning assistance information such as HESSID, SSID, BSSID along with the associated channel information of the WLAN APs 300 within coverage of the 3GPP node.

Thus far the need for the 3GPP node to know the location of the AP(s) within its coverage is also discussed. The UE 100 may obtain this information from the 3GPP node or the UE 100 may obtain this information from the ANDSF server assuming geo-location information is available. If the locations of the APs are available to the UE 100, the UE 100 has the option to utilize proximity detection to determine whether it is within the coverage of an AP 300 and the UE 100 could activate the energy efficient mode which may include the option for the UE 100 to turn off its WLAN radio. With proximity detection the UE 100 may not need to stop applying the energy efficient mode right away. Instead, the UE 100 could wait until it is within "proximity" to the AP before stopping the energy efficient mode. If the 3GPP node does broadcast location information of the APs 300 in its coverage region, we should further consider whether to limit the number of APs 300 to limit the broadcast overhead.

If the 3GPP nodes does not have the APs' location information, further reduction of UE 100 power consumption may be possible using one of the following two options:

1. Rely on UE 100's history of previously connected APs 300. This could work in conjunction with proximity detection.

2. 3GPP node may broadcast further scanning assistance to reduce the UE 100's total time for active scanning. This scanning assistance may come in the form of reduced scanning duration based on e.g., the timing of the beacon frames.

Option 1 has the advantage that no further assistance information is needed and the UE 100 may rely on its history of previously visited APs 300 as the basis for proximity detection. However, if the broadcasted WLAN identities contain one or more APs 300 that aren't previously visited by the UE 100, the UE 100 may need to stop applying the energy efficient mode just in case it comes across an AP 300 that it hasn't previously visited.

Option 2 does not rely on the UE 100's previously visited APs 300. Reduction of UE 100 power consumption is only based on scanning optimization. The disadvantage of option 2 is that the UE 100's energy efficient mode is mainly based on the reduction of duration for active scanning, so power is consumed even if it's nowhere near any of the APs 300.

(Phase 3: Advanced Assistance)

In contrast to the broadcasted assistance information in phases 1 & 2, the advanced assistance mode has the potential of significantly reduced UE power consumption. As described above, even if the UE 100 knows the location of the APs 300, it is still the UE's responsibility to determine whether it is within proximity to an AP 300. If the UE 100 turns on its GPS simply to determine its location, excess power consumption cannot be avoided even if the UE 100 turns off its WLAN radio. Other methods such as fingerprinting and ECID may also be used which could potentially reduce power consumption, but it is questionable whether these other methods are sufficient or supported.

The primary motivation for phase 3 is to minimize power consumption beyond what is capable with solutions from phases 1 & 2. With phase 3, multiple solutions may be applicable. In all cases, the solutions considered assume the network will determine if the UE 100 is within close proximity to the targeted AP 300 (i.e., an AP 300 that isn't heavily loaded). One of the solutions is the case where the 3GPP node determines whether the UE 100 is close to an AP 300 based on location. Another solution is the UL detection mechanism where either the AP 300 or the 3GPP node determines the UE's proximity to an AP 300 based on UL signals sent by the UE 100. Regardless of which solution is used, once the 3GPP node knows that the UE 100's close to an AP 300, it will send a dedicated signaling to the UE 100 to inform or configure the UE 100 to perform measurement of the AP 300. The configuration may also be UE-specific. Regardless of which solution is used, the only thing that needs to be specified is the dedicated signaling. The example solutions, UL detection or the location detection by the network, are just implementations and do not need to be specified. With Phase 3, the UE 100 does not need to keep the WLAN radio ON and no power is wasted for the UE to determine its own location. This does put more of the burden of the network to determine the relative location between the UE 100 and the AP 300.

Therefore, 3GPP node is allowed to inform the UE 100 via dedicated signaling to assist with WLAN AP detection/scanning.

In this case, the UE 100 will be able to operate in the energy efficient mode until the UE 100 receives dedicated signaling from the 3GPP node. This means the Phases 1 & 2 are no longer needed. However, due to network implementation, the 3GPP node may not always be able to track the UE 100 or obtain the AP location information. Then it may be necessary for the 3GPP node to revert back to using the mechanisms from Phases 1 & 2.

If all 3 phases are adopted, there should also be a mechanism for the 3GPP node to indicate to the UE 100 that the network supports such feature so that the UE 100 will know whether to apply other WLAN detection or scanning mechanisms which increases power consumption. If all 3 phases are adopted, 3GPP node should inform the UE 100 if network detection of UE 100's proximity to the AP 300 is supported.

Third Embodiment

The third embodiment will be described while focusing on differences with aforementioned first and second embodiments. The system configuration and operation environment of the second embodiment are similar to the first embodiment.

(Overview of Third Embodiment)

A communication control method according to the third embodiment is a method for controlling a network selection operation (referred to as "access network selection") for selecting an access network, from among a RAN (E-UTRAN 10/eNB 200) and a WLAN (AP 300), in which a UE 100 exchanges. The UE 100 applies, to the network selection operation, at least one of: a RAN rule that is a selection rule pre-defined in the RAN; and an ANDSF rule that is a selection rule provided by an ANDSF. The ANDSF rule is also referred to as ANDSF policy.

Figure 16:
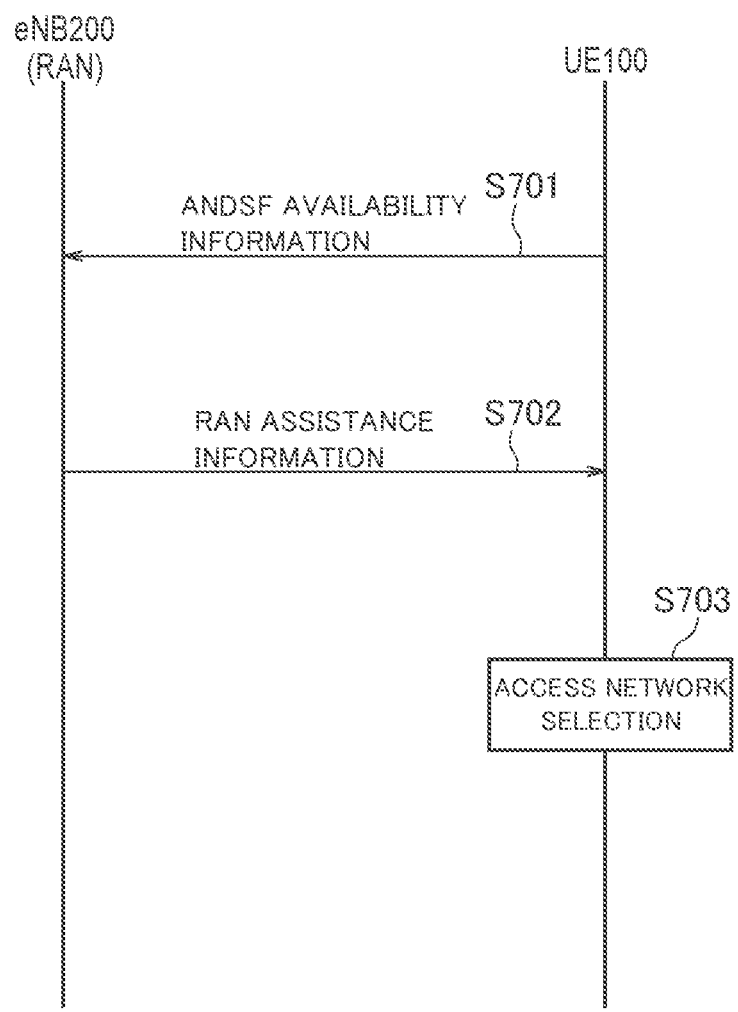
FIG. 16 is a diagram illustrating a communication control method according to a third embodiment.

FIG. 16 is a diagram illustrating a communication control method according to the third embodiment.

As shown in FIG. 16, the communication control method according to the third embodiment includes a step S701 of notifying, from the UE 100 to the RAN, ANDSF availability information indicating an availability relating to the ANDSF; a step S702 of transmitting, from the RAN, RAN assistance information utilized for the network selection operation, on the basis of the ANDSF availability information; and a step S703 of performing, by the UE 100, the network selection operation on the basis of the RAN assistance information.

The ANDSF availability information may be information on whether or not the ANDSF is available for the UE 100.

The ANDSF availability information may include information on whether or not the ANDSF that is available for the UE 100 is an enhanced ANDSF to which the RAN assistance information is applicable.

The communication control method according to the third embodiment may further include a step of determining whether or not the RAN provides an identifier (WLAN identifier) regarding a WLAN access point to the UE 100, on the basis of whether or not the ANDSF is available for the UE 100.

In the step S701, the UE 100 may notify the RAN of the ANDSF availability information, as a part of terminal capability information.

In the step S701, the UE 100 may notify the RAN of the ANDSF availability information, in response to a request from the RAN.

In the step S701, the UE 100 may notify the RAN of the ANDSF availability information, only when the ANDSF or the enhanced ANDSF is not available for the UE 100.

In the step S702, a transmission of first RAN assistance information applied only to the RAN rule may be omitted, when all target UE 100s support the enhanced ANDSF.

In the step S702, a transmission of second RAN assistance information applied only to the ANDSF rule is omitted, when the enhanced ANDSF is available for no target UEs.

The step S702 may include: a step of transmitting common RAN assistance information applied commonly to the RAN rule and the ANDSF rule, by a broadcast; and a step of transmitting, on the basis of the ANDSF availability information, one of first RAN assistance information applied only to the RAN rule and second RAN assistance information applied only to the ANDSF rule.

The ANDSF availability information may include information indicating a home ANDSF of the UE 100.

The communication control method according to the third embodiment may further include a step of determining whether or not the RAN provides an identifier regarding AP 300 to the UE 100, on the basis of whether or not the UE 100 is a roaming state that is a state where a home network corresponding to the home ANDSF and the RAN are different. Moreover, the communication control method may further include a step of determining whether or not the UE 100 applies the identifier regarding AP provided from the RAN, on the basis of whether or not the UE 100 is a roaming state.

The step S703 may include: a step of selecting the access network by applying the RAN rule; and a step of performing a network selection by further applying the ANDSF rule to the selected access network.

Alternatively, the communication control method according to the third embodiment includes: a step A of transmitting, from the RAN, both RAN assistance information applied to the RAN rule and RAN assistance information applied to the ANDSF rule, by a broadcast; and a step B of performing, by the UE 100, the network selection operation on the basis of the RAN assistance information.

FIG. 17 is a diagram illustrating a roaming scenario according to the third embodiment. As shown in FIG. 17, in the roaming scenario, the UE 100 performs a roaming to a visited network 1B. A home network 1A includes a RAN 10A and a home ANDSF 600A. The visited network 1B includes a visited RAN 10B and a visited ANDSF 600B.

A communication control method according to the third embodiment includes a step A of receiving, by a roaming terminal 100 existing in a visited RAN 10B, an offload indicator from the visited RAN, wherein the offload indicator causes a non-roaming terminal to initiate a traffic steering based on a subscriber class of the non-roaming terminal; and a step B of ignoring, by the roaming terminal 100, the offload indicator received from the visited RAN 10B.

Here, the offload indicator is an indicator (OPI: offload preference indicator) having one bit or plural bits. The offload indicator is formed differently for each subscriber class. For example, there is a use case where a traffic of a low grade subscriber is steered to WLAN. The subscriber class is different for each operator. Therefore, it is preferable for roaming terminal 100 not to follow the offload indicator received from the visited RAN 10B.

The roaming terminal 100 behaves as highest class (e.g. gold class) or lowest class (e.g. bronze class) of the subscriber class to ignore the offload indicator. Especially, a gold subscriber, which is allowed a prioritized service in the home PLMN (home network 1A), should be allowed to behave as highest class.

A communication control method according to the third embodiment includes: when the UE 100 exists in a home network 1A, a step A of using, by the UE 100, a WLAN identifier provided by one of an ANDSF and an enhanced ANDSF 600A of the home network 1A, to the network selection operation; and when the UE 100 exists in a visited network 1B, a step B of using, by the UE 100, a WLAN identifier provided by a RAN 10B of the visited network 1B, to the network selection operation. The UE 100 may ignore a WLAN identifier provided by a RAN of the home network 1A. The UE 100 may use the WLAN identifier provided by the RAN 10B of the visited network 1B, to the network selection operation, on the basis of a policy decided by the home network 1A.

(Relationship Between ANDSF and RAN Rules)

There are 2 types of ANDSF:

1. ANDSF: the current ANDSF specified.
2. Enhanced ANDSF—enhanced ANDSF uses RAN assistance parameters provided by system information (SI) and/or dedicated signaling.

One of the main issues that need further clarification is the applicability of RAN rules if either ANDSF or enhanced ANDSF is available to the UE 100. The clarification of this dependency between RAN rules and ANDSF will ensure consistent and proper UE 100 behavior. These dependencies are described in Table 1.

TABLE 1

| | RAN Rule applicable? | Which parts of RAN rules are applicable? |
|---|---|---|
| ANDSF unavailable to UE | Yes | All assistance parameters related to access network selection and traffic steering are applicable. |
| ANDSF available to UE | Yes | All assistance parameters related to access network selection and traffic steering are applicable except for the WLAN identifier. It is FFS whether roaming UEs will still require the WLAN identifier. (Note 2) |
| Enhanced ANDSF available to UE | No (Note 1) | N/A |

(Note 1):
Will depend on the details of the enhancements to ANDSF which is currently FFS.
(Note 2):
Further discussions are needed to determine whether RAN can restrict WLAN accessibility decided by ANDSF.

With reference to Table 1, it is clear that the need for RAN rule can differ substantially depending whether ANDSF is available, and which type of ANDSF is available. It is understandable that the availability of (the type of) ANDSF will largely depend on both network deployment and UE capability (whether the UE 100 supports ANDSF or not). It is also important to consider the roaming scenario as the availability of ANDSF may not have the same implication as non-roaming scenario when it comes to the need for applying RAN rules. Roaming scenarios are detailed later.

Therefore, depending on the availability of ANDSF, the necessary assistance information from RAN rules may differ. It is important how RAN realizes whether ANDSF is available or not, and whether the ANDSF is enhanced or not.

(Provisioning of RAN Assistance Information)

Assuming the RAN assistance information/parameters may be different depending on whether they are needed for RAN rules or enhanced ANDSF policies, the RAN would need to know if enhanced ANDSF is available to the UE 100 or not. This is not just about whether enhanced ANDSF is deployed or not but rather if the UE 100 supports the enhanced ANDSF. For this reason it may be necessary for the RAN to know if any UE or all UEs support the enhanced ANDSF. If all UEs support the enhanced ANDSF then it is not necessary for the RAN to broadcast any assistance information only used for RAN rules. On the other hand, if no UEs support the enhanced ANDSF, it's not necessary for the RAN to provide assistance information only applicable to the enhanced ANDSF. As long as one UE doesn't support the enhanced ANDSF, then assistance information for the RAN rules may still need to be provided. Below are some of options for the RAN to determine the provisioning of RAN assistance information.

1. UE reports its capability (ANDSF availability information) to the RAN

Each UE 100 is required to provide this information to the RAN as part of the UE capability information.

The RAN can request this information from each UE 100 as needed.

Only UEs 100 that do not support enhanced ANDSF will need to inform the RAN.

RAN has the option to provide assistance information for RAN rules or enhanced ANDSF or both to specific UEs 100 (via dedicated signalling) This may be particularly effective if only a few UEs 100 do or don't support the enhanced ANDSF.

2. Assistance information for both RAN rules and enhanced ANDSF are always provided by the RAN regardless of whether any or all UEs 100 support the enhanced ANDSF.

3. (Combination of 1 and 2) Non-UE specific common assistance information for both RAN rules and enhanced ANDSF policies can be optionally provided by the RAN (e.g., via SIB).

Examples of common assistance parameters include the RAN's load information (direct, indirect), offload preference, thresholds (load, signal strength, etc.). Assistance parameters not common to both RAN rules and enhanced ANDSF (e.g. WLAN identifier) may be provided via dedicated signaling if RAN knows whether the enhanced ANDSF is available to the UE 100. If all RAN assistance parameters (common or not) should be provided, it should be further discussed whether assistance parameters not common to RAN rules and ANDSF should be provided via broadcast.

Therefore, one of the 3 options should be adopted for the provisioning of RAN assistance parameters.

(Access Network Selection and Traffic Routing Under Various ANDSF Scenarios)

Although the applicability of RAN rules under various ANDSF availability conditions is clarified in Table 1, it is still necessary to consider the RAN assistance parameters needed for both access network selection and traffic routing.

1) ANDSF Unavailable to UE 100 (Only RAN Rules are Applicable)

Currently, it is assumed that RAN assistance parameters used for the RAN rule are transferred via system broadcast and/or dedicated signaling used in a case where enhanced ANDSF is not deployed in the network or not supported by the UE 100. Therefore, it is clear that RAN rule should be applied if both ANDSF and enhanced ANDSF are not applicable. Then it is necessary to discuss the contents of RAN rules for both access network selection and traffic routing. As for access network selection, contents of RAN assistance parameters, and how to provide RAN assistance information to the UE 100. As for traffic routing (granularity of this routing is basically per APN level), contents of traffic routing information (e.g. which bearer should not be steered), and how to provide traffic routing information to the UE 100.

2) Enhanced ANDSF Available to UE 100 (RAN Rules are not Applicable)

Currently, it is assumed that RAN assistance parameters used for the enhanced ANDSF policy are transferred via system broadcast and/or dedicated signaling used in case enhanced ANDSF is deployed in the network and supported by the UE. Then, if enhanced ANDSF is available, it is clear that the enhanced ANDSF policy shall be applied. The contents of RAN assistance information should be further discussed for both access network selection and traffic routing.

3) ANDSF Available to UE 100 (a Part of RAN Rules are Applicable)

Currently, it is assumed that RAN assistance information may be enhanced with WLAN identifiers in case ANDSF is not deployed or not supported by the UE 100. In this case, RAN assistance information is not enhanced with WLAN identifiers. The assumption is that WLAN identifier is already provided by the ANDSF.

However, in the roaming scenario, WLAN identifier provided by home-ANDSF and visited-RAN may be different. The visited-RAN has no chance to provide its WLAN list if home-ANDSF is available. Therefore, it is preferable that WLAN identifier is provided for roaming UEs 100.

(Restriction of WLAN Accessibility)

Advantages and disadvantages for restricting WLAN accessibility by RAN will be considered.

Advantage: Dynamic Load Balancing

ANDSF cannot reflect dynamic conditions (e.g. load of WLAN). If RAN rule is allowed to remove certain WLANs that do not satisfy RAN selection rules, access network can be selected dynamically. Some operators may prefer such dynamic operation and other operators prefer just to use ANDSF. In order to provide sufficient flexibility to the operator it may be possible for the RAN to provide a one-bit indicator, to indicate whether RAN rule is allowed to restrict WLAN availability.

For access network selection, it is beneficial for the RAN to be able to restrict particular WLAN listed by ANDSF since only the RAN has knowledge of dynamic load balancing. However, for selection of traffic to be steered, there is little advantage for the RAN rule to take into account of dynamic load situation. The type of traffic suitable for steering toward WLAN is already well defined in the ANDSF and would not change dynamically. Also RAN doesn't have detailed traffic information such as IP flow; therefore, it is sufficient to just use ANDSF functions to select traffic to be steered.

Therefore, when ANDSF is available to the UE 100, RAN rules can only affect the selection of access network between RAN and WLAN. To provide further flexibility for operator control, RAN should be allowed to indicate whether RAN rules can restrict the availability of certain WLAN.

Disadvantage:

1) Inter-Layer Specification is Needed

RAN rule is within RAN layer, on the other hand ANDSF is available on the application layer. We have to consider the impact of the interaction between these two layers. For example, if the UE 100 checks the applicability of a particular WLAN based on RAN rules first. Then the selected WLAN must be subsequently passed to the NAS layer (ANDSF) for further processing.

2) "Gold Subscriber" May not be High Prioritized in Roaming Case

In the roaming scenario, if the roaming UE 100 is a "gold subscriber" which allows prioritized services in its home PLMN, the UE may not have the same grade of service in the visited network due to the restriction from visited RAN.

(SSID Provisioning to Roaming UE)

In non-roaming case, it is straight forward for the UE to only use WLAN identifiers provided by ANDSF. However, in the roaming case, WLAN identifier provided by home-ANDSF and visited-ANDSF may be different. Whether or not the WLAN identifier can be applicable to roaming UEs 100 may depend on the home operator preference. Therefore, it should be discussed if roaming UEs 100 can decide autonomously based on their home operator's preference whether WLAN identifier is applicable. It is FFS whether the RAN can decide whether the WLAN identifiers are applicable to roaming UEs 100 or if the use of WLAN identifiers is only decided by the home operator.

Other Embodiments

Aforementioned first to third embodiments may be combined each other, not apply only to individual use.

In the aforementioned embodiments, the LTE system is described as one example of cellular communication systems. However, the present disclosure may be applied to other system than the LTE system, not apply only to the LTE system.

INDUSTRIAL APPLICABILITY

The present disclosure is useful in mobile communication fields.

The invention claimed is:

1. A user terminal, comprising:
a controller containing at least one processor, and configured to perform a network selection operation for selecting an access network in which the user terminal exchanges traffic from among a cellular RAN (Radio Access Network) and a wireless LAN (Local Area Network), wherein
the controller is further configured to:
store a RAN rule predefined in layers of the cellular RAN, wherein the RAN rule is a network selection rule for determining whether the user terminal should perform traffic steering to the WLAN that has a WLAN identifier provided by the cellular RAN, wherein the WLAN identifier is one of SSID (Service Set Identifier), BSSID (Basic Service Set Identifier), and HESSID (Homogenous Extended Service Set Identifier);
receive a first WLAN identifier broadcasted in a first SIB (system information block) from a first cellular base station of a first cellular RAN which is a home network of the user terminal;
apply the first WLAN identifier to the RAN rule to determine whether to perform the traffic steering to a first WLAN that has the first WLAN identifier, in the first cellular RAN;
perform roaming from the first cellular RAN to a second cellular RAN, which is a visited network;
determine whether to acquire a second WLAN identifier provided by the second cellular RAN, based on a policy established by the first cellular RAN;
receive the second WLAN identifier broadcasted in a second SIB from a second cellular base station of the second cellular RAN; and
apply the second WLAN identifier to the RAN rule to determine whether to perform traffic steering to the WLAN that has the second WLAN identifier, in the second cellular RAN.

2. The user terminal according to claim 1, wherein
the controller is further configured to
receive a capability request from the first cellular base station, the capability request requesting a notification of a capability of the user terminal; and
in response to receiving the capability request, notify the first cellular base station that the user terminal has a capability of performing the network selection using an access network discovery and selection function (ANDSF) rule to which the RAN assistance information is applied.

3. A device to be equipped in a user terminal, comprising:

a processor and a memory, the processor configured to cause the user terminal to perform a network selection operation for selecting an access network in which the user terminal exchanges traffic from among a cellular RAN (Radio Access Network) and a wireless LAN (Local Area Network), wherein the processor is further configured to cause the user terminal to:

store a RAN rule predefined in layers of the cellular RAN, wherein the RAN rule is a network selection rule for determining whether the user terminal should perform traffic steering to the WLAN that has a WLAN identifier provided by the cellular RAN, wherein the WLAN identifier is one of SSID (Service Set Identifier), BSSID (Basic Service Set Identifier), and HESSID (Homogenous Extended Service Set Identifier);

receive a first WLAN identifier broadcasted in a first SIB (system information block) from a first cellular base station of a first cellular RAN which is a home network of the user terminal;

apply the first WLAN identifier to the RAN rule to determine whether to perform the traffic steering to a first WLAN that has the first WLAN identifier, in the first cellular RAN;

perform roaming from the first cellular RAN to a second cellular RAN, which is a visited network;

determine whether to acquire a second WLAN identifier provided by the second cellular RAN, based on a policy established by the first cellular RAN;

receive the second WLAN identifier broadcasted in a second SIB from a second cellular base station of the second cellular RAN; and apply the second WLAN identifier to the RAN rule to determine whether to perform traffic steering to the WLAN that has the second WLAN identifier, in the second cellular RAN.

\* \* \* \* \*